United States Patent
Hill

(10) Patent No.: US 12,056,068 B2
(45) Date of Patent: Aug. 6, 2024

(54) MEMORY DEVICES AND METHODS HAVING MULTIPLE ACKNOWLEDGEMENTS IN RESPONSE TO A SAME INSTRUCTION

(71) Applicant: Adesto Technologies Corporation, Santa Clara, CA (US)

(72) Inventor: Paul Hill, Bishopstoke (GB)

(73) Assignee: Adesto Technologies Corporation, Santa Clara, CA (US)

( * ) Notice: Subject to any disclaimer, the term of this patent is extended or adjusted under 35 U.S.C. 154(b) by 0 days.

(21) Appl. No.: 17/867,638

(22) Filed: Jul. 18, 2022

(65) Prior Publication Data

US 2022/0350761 A1 Nov. 3, 2022

Related U.S. Application Data

(63) Continuation of application No. 15/351,390, filed on Nov. 14, 2016, now Pat. No. 11,392,516, which is a
(Continued)

(51) Int. Cl.
*G06F 13/16* (2006.01)
*G06F 13/24* (2006.01)
(Continued)

(52) U.S. Cl.
CPC ...... *G06F 13/1673* (2013.01); *G06F 13/1689* (2013.01); *G06F 13/24* (2013.01); *G06F 13/4072* (2013.01); *G06F 13/4282* (2013.01)

(58) Field of Classification Search
CPC ............ G06F 13/1673; G06F 13/1689; G06F 13/24; G06F 13/4072; G06F 13/4282
See application file for complete search history.

(56) References Cited

U.S. PATENT DOCUMENTS 7,117,275 B1 * 10/2006 Ofek ..................... G06F 3/0683
710/33
7,836,233 B2 * 11/2010 Tsunedomi ........ G05B 19/0421
710/110
(Continued)

OTHER PUBLICATIONS

U.S. Appl. No. 15/351,390, filed Nov. 14, 2016, parent to the present application.

*Primary Examiner* — Henry Tsai
*Assistant Examiner* — Harry Z Wang

(57) ABSTRACT

A memory device A memory device can include a serial interface (IF) configured to receive an operational code (op code) of no less than 16-bits and provide a plurality of acknowledgement values in response to the received op code. Controller circuits can generate the plurality of acknowledgement values, including first and second acknowledgement values in response to an operation indicated by the op code being completed, and first and third acknowledgement values in response to an operation indicated by the op code not being completed. Memory circuits can be configured to execute the operation indicated by the op code to access the nonvolatile memory cells, and indicate to the controller circuits whether or not the operation was completed. The first, second and third acknowledgement values can be different multi-bit values. Corresponding methods and systems are also disclosed.

17 Claims, 10 Drawing Sheets

Related U.S. Application Data continuation of application No. PCT/US2015/031249, filed on May 15, 2015.

(60) Provisional application No. 61/993,509, filed on May 15, 2014.

(51) Int. Cl.
*G06F 13/40* (2006.01)
*G06F 13/42* (2006.01)

(56) References Cited

U.S. PATENT DOCUMENTS

2005/0160246 A1* 7/2005 Franke ................ G06F 13/161
　　　　　　　　　　　　　　　　　　　　711/167
2010/0332855 A1* 12/2010 Dolgunov ............ G06F 13/385
　　　　　　　　　　　　　　　　　　　　713/194
2014/0040527 A1* 2/2014 Kanigicherla ...... G06F 13/4022
　　　　　　　　　　　　　　　　　　　　710/316
2015/0212738 A1* 7/2015 D'Eliseo ................ G06F 12/00
　　　　　　　　　　　　　　　　　　　　711/154

* cited by examiner

FAST READ/WRITE

BACKUP

RECALL/ WRITE TO MAIN

RECALL/ WRITE TO MAIN

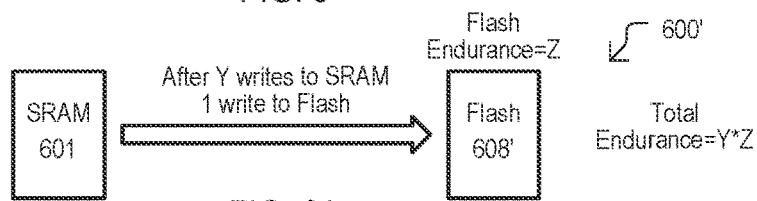
FIG. 6A
(Conventional)

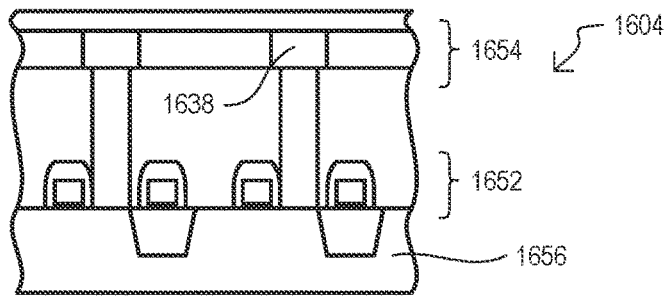
FIG. 16
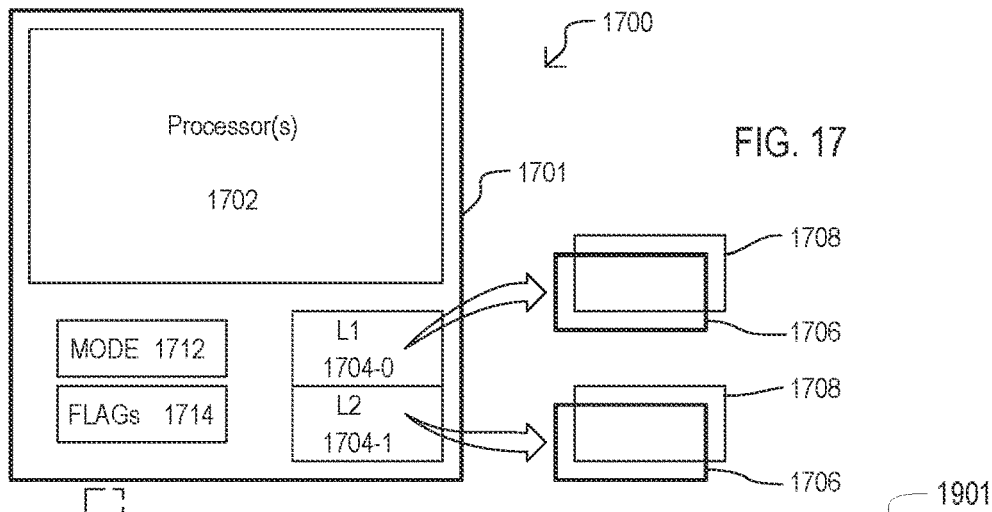
FIG. 17
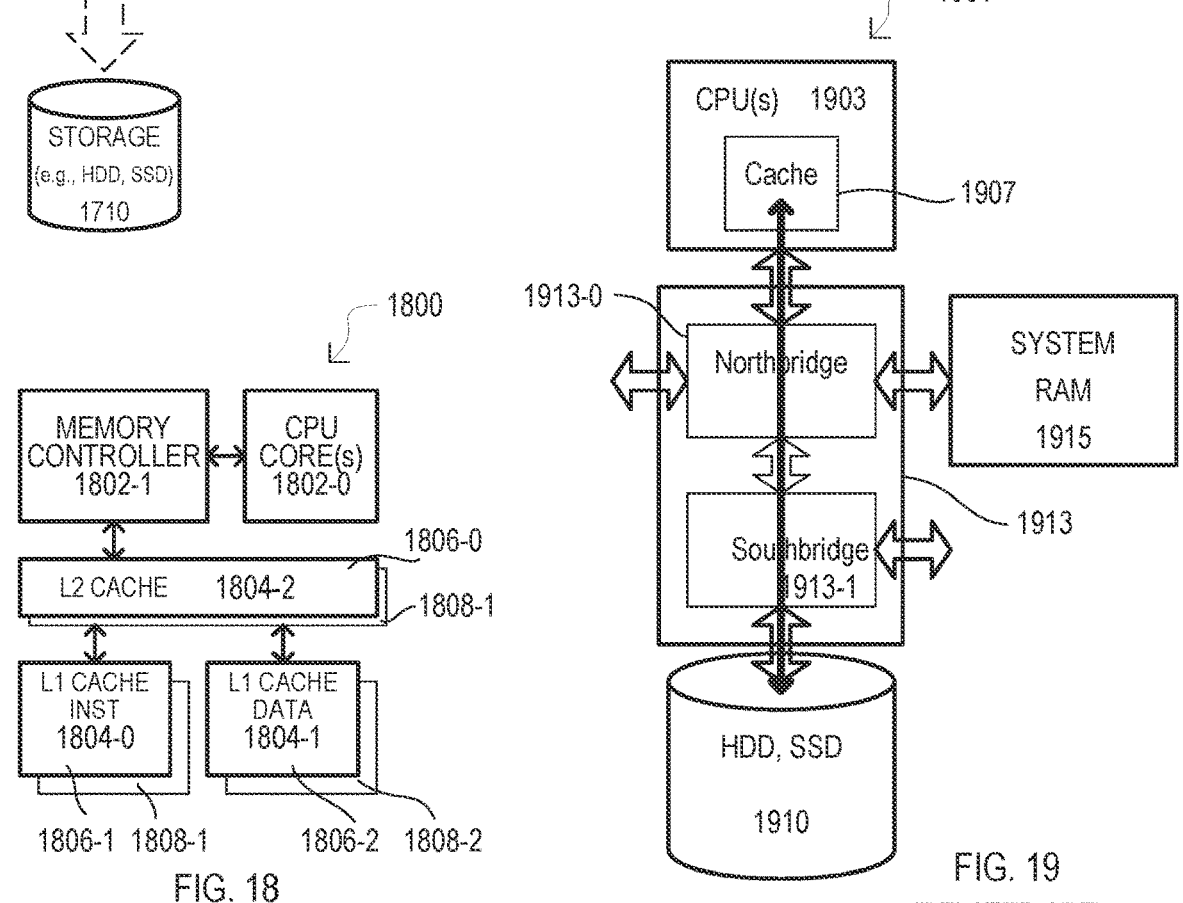
FIG. 18
FIG. 19
(RELATED ART)

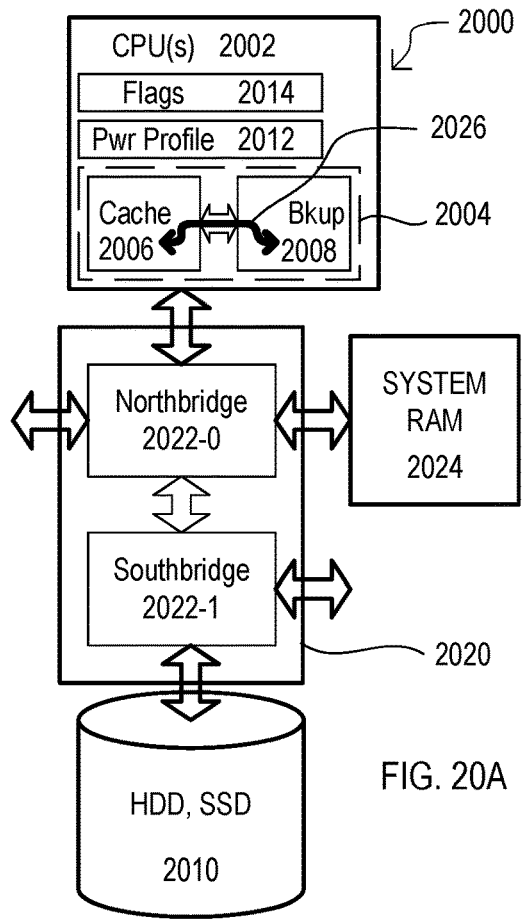
FIG. 20A
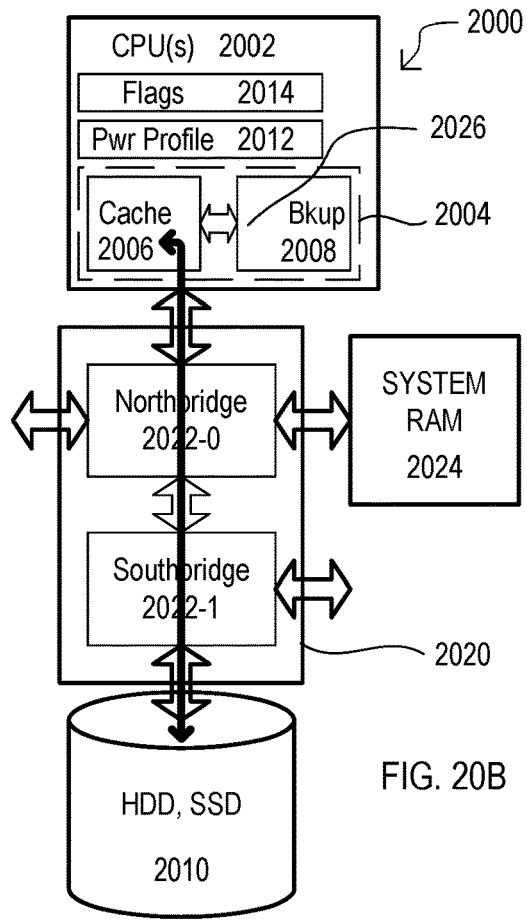
FIG. 20B
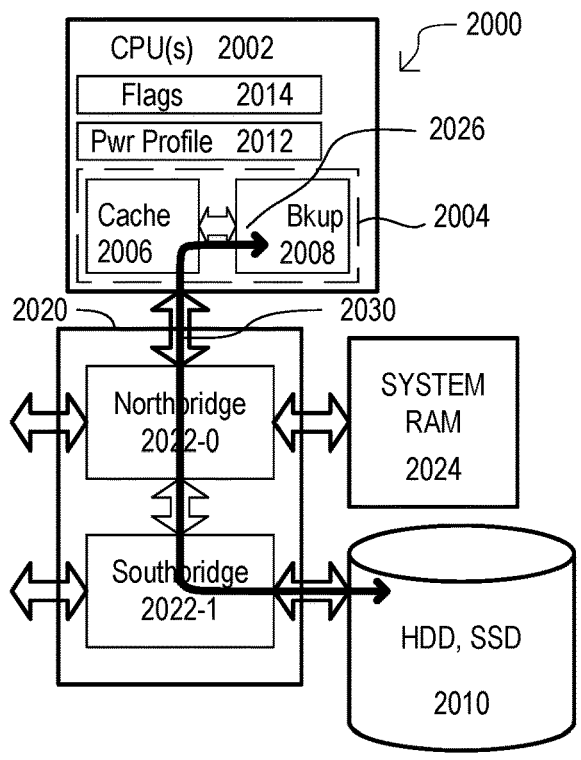
FIG. 20C
```
Cache Save                                 2018
if save_cache
   if power_mode=low_power
      write cache to backup
      set flag_cache_backup=1
   else
      write cache to hard drive
      set flag_cache_backup=0
```
```
Cache Recall                               2019
if recall_cache
   if set flag_cache_backup=1
      read from backup to cache
   else
      read from hard drive to cache
```
FIG. 20D મેMORY DEVICES AND METHODS HAVING MULTIPLE ACKNOWLEDGEMENTS IN RESPONSE TO A SAME INSTRUCTION

PRIORITY CLAIMS

This application is a continuation of U.S. patent application Ser. No. 15/351,390 filed on Nov. 14, 2016, which is a continuation of Patent Cooperation Treaty (PCT) Application No. PCT/US2015/031249 filed May 15, 2015, which claims the benefit of U.S. Provisional Patent Application No. 61/993,509 filed May 15, 2014, the contents all of which are incorporated by reference herein.

TECHNICAL FIELD

The present disclosure relates generally to memory circuits that can receive commands from a host device, and more particularly to memory circuits which can acknowledge the execution and/or receipt of a command from a host device.

BACKGROUND

In many conventional systems that include a host device connected to one or more other devices over a bus, such a serial bus, a host device can expend power and time accessing (i.e., polling) a memory device to determine when an operation has been completed.

FIG. 26 shows a conventional system 2601 that includes a host device microcontroller (MCU) 2650 and a memory device 2603 connected to one another by a serial bus 2652. A memory device 2603 can include nonvolatile memory cells, such as EEPROMs. In operation, MCU 2650 can issue commands to memory device 2603. Some commands, such as programs or erases to the nonvolatile memory cells, can take relatively large amounts of time. To determine when such an operation is complete, host device 2650 can periodically read a status register 2621 within the memory device 2603, which can include one or more bit values that can be updated when the operation is complete. The host device 2650 remains active during such operations, consuming power.

To reduce power, a host device 2650 can use a fixed time out loop. The host device 2650 can wait to poll the memory device 2603 after some worst-case timing window. However, such an approach still has the host device 2650 consuming power as it waits for the polling operation. Further, the worst-case timing window can be longer than is needed for many operations, thus slowing the system down. Alternatively, a host device 2650 can enter a sleep mode, and rely on a real-time clock 2623 to wake it and poll the memory device 2603. While this can reduce power consumption, the polling period can be longer than is necessary for many operations.

FIG. 27 shows another conventional system 2701. A conventional system 2701 can include a serial interface 2725, a controller 2727, and application circuits 2729. Conventional command processing will now be described. At (1) command 2733 can be received at interface 2725. Interface 2725 can forward such a command to controller 2727. At (2) controller 2727 can generate signals for application circuits 2729 to perform operations indicated by the command. At (3) application circuits 2729 can complete operations and generate an execution complete indication. This indication can be received by controller 2727. At (4) controller 2727 can generate a command complete code 2735 which can be forwarded to interface 2725. Interface 2725 can output the command complete code 2735, or store such a value for subsequent reading.

In some conventional systems, a system 2701 can generate another acknowledgement if a command cannot be executed. In such cases, at (3) application circuits 2729 can indicate the command cannot be executed. This indication can be received by controller 2727. At (4) controller 2727 can generate a command not executed code (or error code) which can be forwarded to interface 2725. Interface 2725 can output the command not executed code or store such a value for subsequent reading.

BRIEF DESCRIPTION OF THE DRAWINGS

FIGS. 6A and 6B are block diagrams comparing endurance between a conventional memory device and that according to an embodiment.

FIG. 16 is a side cross sectional view of a buffer that can be included in embodiments.

FIG. 17 is a block diagram showing an integrated circuit (IC) device according to an embodiment.

FIG. 18 is a block diagram of a processing section according to an embodiment.

FIG. 19 is a block diagram of a conventional system.

FIG. 20A to 20D are diagrams showing a system and corresponding operations according to an embodiment.

DETAILED DESCRIPTION

Embodiments can include devices, including memory devices, and systems and methods containing the same, which can process commands. In particular embodiments, a device can receive commands for execution, which can include accessing a buffer memory or cache memory as described herein. Such embodiments can enable the generation of an acknowledgement signal for particular commands. Such acknowledgements can indicate that the command has been received, without the command having yet been processed and/or can be generated if or when the command is processed.

Figure 1:
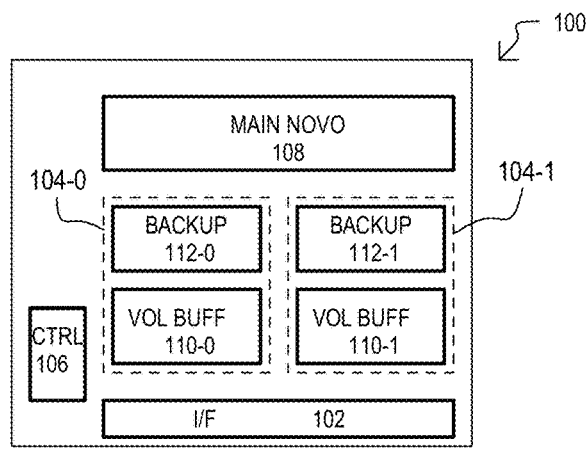
FIG. 1 is a block schematic diagram of a memory device according to an embodiment.

FIG. 1 shows a memory device that can be included in embodiments. A device 100 can include an interface 102, first buffer 104-0, second buffer 104-1, control circuit 106, and nonvolatile main storage 108. An interface (I/F) 102 can process commands to access data locations within the device (e.g., reads and/or writes). Thus, an I/F 102 can receive write data and output read data. An I/F 102 can be any suitable interface, including a custom interface or an interface according to an existing standard. In some embodiments, an interface can be a serial interface. In very particular embodiments, an interface can be compatible with the Serial Peripheral Interface (SPI) and/or RapidS standards. An I/F 102 can also provide command acknowledgements as will be described in more detail below.

Buffers 104-0/1 can buffer data for main storage 108 with respect to accesses via I/F 102. Thus, in a write operation, a buffer 104-0/1 can receive write data from I/F 102, and subsequently transfer such data to the main storage 108. In a read operation, a buffer 104-0/1 can receive and store read data from main storage 108, and such read data can be subsequently read by a requesting device (not shown) via I/F 102. While FIG. 1 shows two buffers 104-0/1, alternate embodiments can include one buffer, or more than two buffers. Buffers 104-0/1 can each include a volatile section (110-0/1) and a backup section (112-0/1). A volatile section (110-0/1) can include volatile memory circuits that provide rapid access to write/read data, but that do not retain data values in the absence of power. In some embodiments, a volatile section can include static random access memory (SRAM) type cells. However, other embodiments can include any other suitable memory cell types, including but not limited to dynamic RAM (DRAM) type cells (including those with "pseudo-SRAM" type architectures).

A backup section 112-0/1 can include memory elements that store data in a nonvolatile or quasi-nonvolatile fashion. A quasi-nonvolatile fashion can allow data to be stored for a substantial period of time in the absence of power. In particular embodiments, such storage can be on the order of minutes and up to months. Nonvolatile storage can last for years, or substantially longer. In some embodiments, backup sections 112-0/1 can include two-terminal memory elements programmable between different impedance values. In particular embodiments, backup sections can include resistive RAM (RRAM) type elements. In very particular embodiments, backup sections 112-0/1 can be conductive bridging random access (CBRAM) type elements, including elements having one or more solid electrolyte layers or other materials based on oxidation/reduction reactions to alter an impedance of such elements.

It is noted that within buffers 104-0/1, volatile and backup sections can be formed with integrated memory cells, or separate memory cells. In an integrated arrangement, buffers 104-0/1 can be conceptualized as having "hybrid" memory cells that include both volatile portions and nonvolatile (or quasi-nonvolatile) portions. Such cells can operate in three modes: "volatile" access, in which data can be read and written to the cells in a relatively rapid manner; "program", in which a data values stored by the cell can be written into the nonvolatile (or quasi-nonvolatile) elements; and "recall", in which data values stored by nonvolatile (or quasi-nonvolatile) elements can be transferred to the corresponding volatile section.

As noted above, data stored in a buffer 104-0/1 can be eventually written into a main storage 108, or data in main storage 108 can be read into a buffer. In an integrated arrangement (i.e., hybrid type buffer cells), there can be a read/write (read/program) path between main storage 108 and each buffer 104-0/1.

In other embodiments, within buffers 104-0/1, volatile sections 110-0/1 can include memory cells separate from those of backup sections 112-0/1. Thus, buffers 104-0/1 can include volatile sections 110-0/1 having one or more arrays of volatile memory cells, while backup sections 112-0/1 can include one or more arrays of nonvolatile (or quasi-nonvolatile) memory cells. In such embodiments, buffers 104-0/1 can also operate in the three modes: "access", in which volatile sections are accessed; "program", in which data in memory cells of the volatile section 110-0/1 are written (e.g., programmed) into memory cells of the corresponding backup section 112-0/1; and "recall", in which data in memory cells of the backup section 112-0/1 are written into the memory cells of the corresponding volatile section 110-0/1.

In a separated arrangement (i.e., volatile section 110-0/1 a separate array than backup section 112-0/1), one or more paths can exist between each buffer 104-0/1 to the main storage 108. In some embodiments, a data path can exist between each volatile section 110-0/1 and the main storage, with no direct data path existing between backup sections 112-0/1 and main storage 108. In other embodiments, the opposite arrangement can exist, with a data path existing between each backup section 112-0/1 and the main storage 108, and no direct data path existing between volatile sections 110-0/1 and the main storage 108. In still other embodiments, data paths can exist between the main storage 108 and both the backup section 112-0/1 and volatile section 110-0/1 of a buffer 104-0/1.

In some embodiments, each volatile section 110-0/1 can have the same size (bit storage capacity) as its corresponding backup section 112-0/1. In such embodiments, a backup section 112-0/1 operates to "mirror" data stored in the corresponding volatile section. In other embodiments, a backup section 110-0/1 can be larger than a corresponding volatile section 112-0/1. In such embodiments, writes from a volatile section 110-0/1 to a backup section 112-0/1 can rotate between different portions of the backup section 112-0/1 for greater endurance of the buffer 104-0/1. In addition or alternatively, a portion of the backup section 112-0/1 can be used to expand the size of the buffer 114-0/1. That is, an address space of a buffer may occupy both volatile and nonvolatile memory arrays. In other embodiments, a volatile section 110-0/1 can be larger than a corresponding back up section 112-0/1. In such embodiments, a particular portion of the volatile section 110-0/1 can be mirrored by the corresponding backup section 112-0/1.

Saving data in buffers 104-0/1 can have speed and/or power advantages over conventional arrangements. In a conventional arrangement, data can be buffered in SRAM arrays, which write and read to a flash electrically erasable read only memory (EEPROM) main storage. That is, in order to save buffer data states, the data must be written (i.e., programmed) into the flash main storage. In sharp contrast, according to embodiments, data in a buffer 104-0/1 can be retained in a backup section 112-0/1. Further, in particular embodiments, the power and/or energy involved in saving data to a backup section 112-0/1 can be less than that to write such data to the main storage 108. In addition or alternatively, the time involved in saving data to a backup section 112-0/1 can be less than that to write such data to the main storage 108. As will be described in more detail below, utilizing buffers 104-0/1 to retain data in a nonvolatile (or quasi-nonvolatile fashion) can increase an overall endurance for a memory device 100, as compared to the conventional case.

A control circuit 106 can generate control signals for executing the various functions of the device. In particular embodiments, received command data from I/F 102 can be decoded to generate appropriate control signals. According to embodiments, a control circuit 106 can execute data writes from volatile sections 110-0/1 to corresponding backup sections 112-0/1 in response to predetermined events. Such events can include, but are not limited to: power interruptions, power-down sequences (e.g., controlled power-down), particular input commands, or internal device actions (e.g., periodic backups). Similarly, control circuit 106 can execute data reads from backup sections 112-0/1 to corresponding volatile sections 110-0/1 in response to predetermined events, including but not limited to power-on or reset conditions, or particular input commands. A control circuit 106 can also store one or more data values (e.g., pointers) or other memory position data, to track transfers between volatile sections 110-0/1 to corresponding backup sections 112-0/1, or data transfers between buffers 104-0/1 and main storage 108. For devices having more than one buffer 104-0/1, a control circuit 106 can control data transfers between I/F 102 and the buffers 104-0/1. A control circuit 106 can generate command acknowledgements in response commands received at I/F 102.

A main storage 108 can include nonvolatile memory cells. In particular embodiments, a main storage 108 can include EEPROM cells having a NOR type architecture. However, in other embodiments, a main storage can include flash cells having a NAND type architecture. In alternate embodiments, a main storage 108 can include two-terminal memory elements programmable between different impedance values, such as resistive RAM type elements, including, but not limited to, CBRAM type elements. In one very particular embodiment, a main storage 108 and backup sections 112-0/1 can include CBRAM type elements, with CBRAM elements in the backup sections being subject to shorter and/or lower voltage/current programming operations than elements in the main storage 108 (and hence having a shorter retention time).

In some embodiments, a device 100 can be a single integrated circuit device. That is, all sections can be formed in a same integrated circuit (IC) substrate, or such sections can be different ICs in a same package.

FIGS. 2A to 2E show various operations for a memory device like that of FIG. 1. In FIGS. 2A to 2E, a device 100 can receive power via a main source (MAIN) 103 or a back-up source (BACKUP) 105. A back-up power source can provide limited power, as will be described in more detail below. It is understood that in some embodiments, MAIN 103 and BACKUP 105 can be supply levels of a same power supply source (i.e., once the power level drops to a certain point, it is then at a back-up level).

Figure 2A:
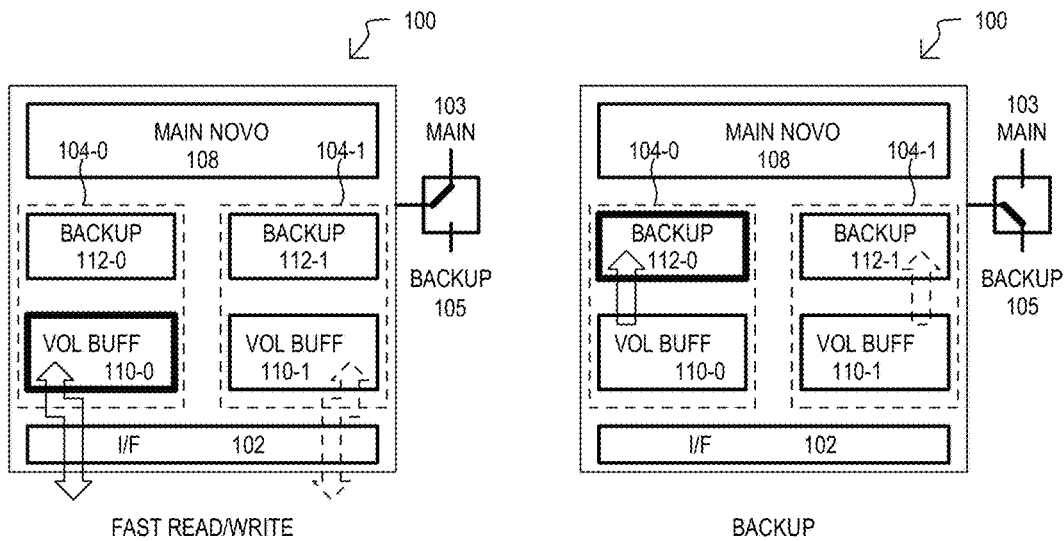
FIGS. 2A to 2E show various operations of a memory device like that of FIG. 1.

FIG. 2A shows fast read and/or write operations. Data can be written to, or read from, volatile sections 110-0/1 of a buffer 104-0/1. Such accesses can be fast, as accesses to volatile section 110-0/1 can be faster than accesses to a main storage 108 and/or backup sections 112-0/1. In the embodiment shown, such accesses can occur when a device receives main power 103. In some embodiments, a device 100 includes multiple volatile sections 110-0/1 and if one volatile section is in use, the other volatile section can be accessed. For example, if data is being transferred from a volatile section 110-0 to a corresponding backup section 112-0 (or main storage 108) the other volatile section 110-1 can be accessed via I/F 102. In a very particular embodiment, one buffer 104-0/1 can be active (i.e., available for read/writes via I/F 102) at any given time.

Figure 2B:
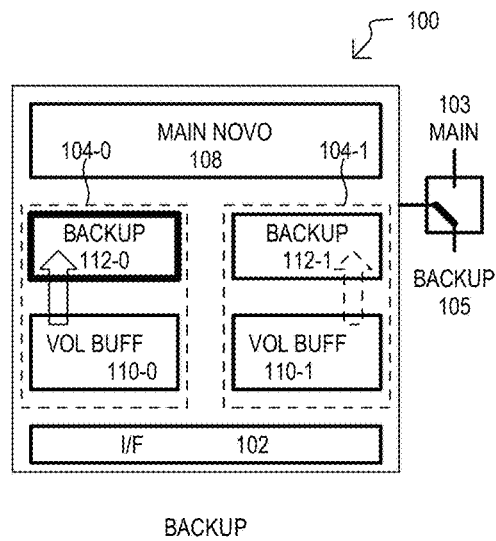

FIG. 2B shows a backup operation according to an embodiment. In the embodiment shown, a backup operation can occur as a device is being powered by a BACKUP power source 105. In a backup operation, data stored in a volatile section 110-0/1 can be written into the corresponding backup section 112-0/1. As noted above, in some embodiments, such an action can consume less power and/or be faster than a same sized write from a buffer 104-0/1 to main storage 108. It is also noted that a backup operation like that of FIG. 2B can be executed under main power conditions, in response to device conditions or a command, as but two examples.

Figures 0, 2C:
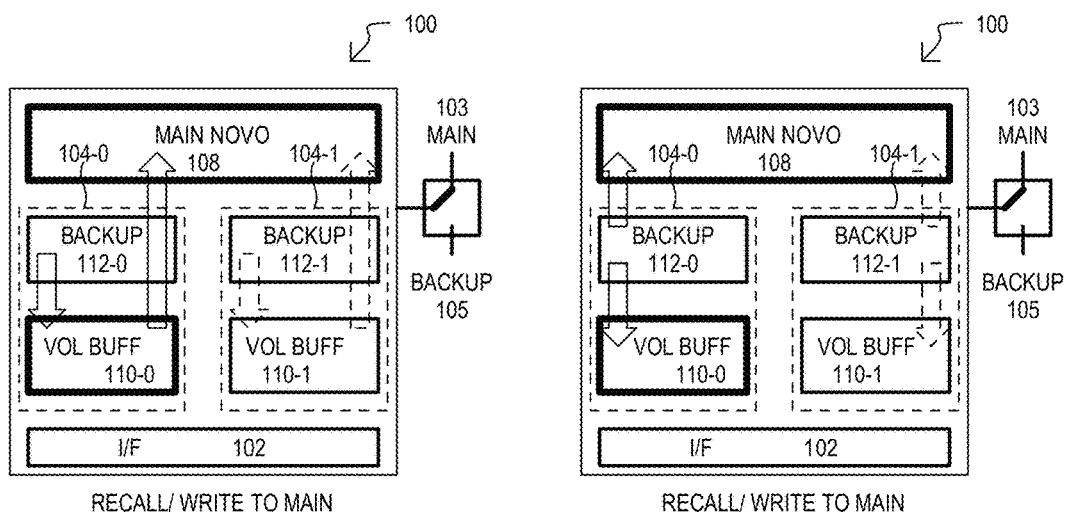
Figures 1, 2C:
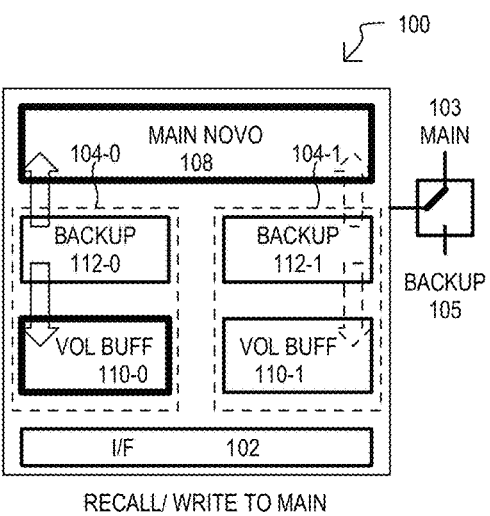

FIGS. 2C-0/1 show examples of recall/write-to-main operations according to embodiments. In such operations, data in a backup section 112-0/1 can be written back into a corresponding volatile section 110-0/1, as well as to main storage 108. In the embodiment of FIG. 2C-0, a direct write path does not exist between a backup section 112-0/1 and main storage 108. Accordingly, data can be recalled from backup section 112-0/1 to a corresponding volatile section 110-0/1, and then written (e.g., programmed) into the main storage 108 from the volatile section 110-0/1. In the embodiment shown, such operations can occur under main power conditions.

In the embodiment of FIG. 2C-1, a direct write path exists between a backup section 112-0/1 and main storage 108. Accordingly, data can be recalled from backup section 112-0/1 to a corresponding volatile section 110-0/1 and also written into main storage 108 from the backup section 112-0/1. In the embodiment shown, such operations can occur under main power conditions.

Figure 2D:
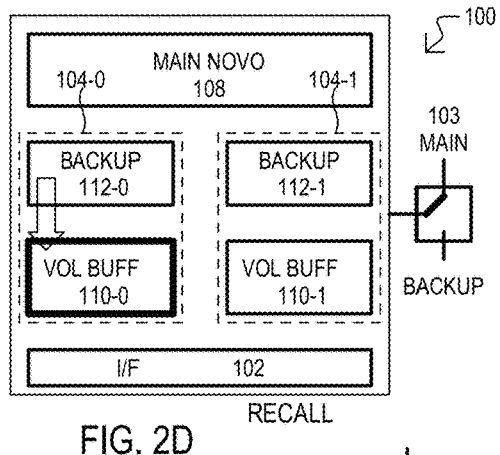

FIG. 2D shows a recall operation according to an embodiment. In the particular example of FIG. 2D, data within a backup section 112-0/1 can be recalled back to the corresponding volatile section 110-0/1, but not written to main storage 108. In the embodiment shown, such operations can occur under main power conditions.

Figure 2E:
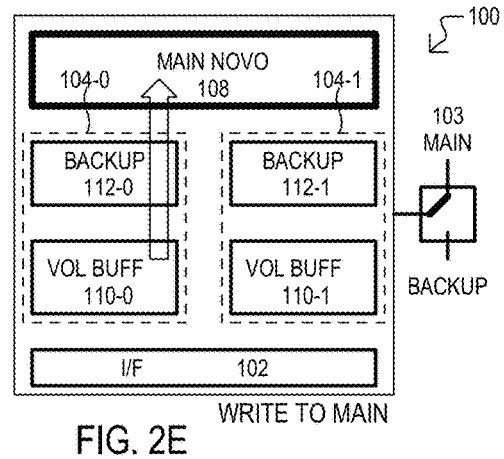

FIG. 2E shows one example of a write-to-main operation according to an embodiment. In such an operation, data in a volatile section 110-0/1 can be written into a main storage 108, but not necessarily to a corresponding backup section 112-0/1. In the embodiment shown, such operations can occur under main power conditions.

Figure 3:
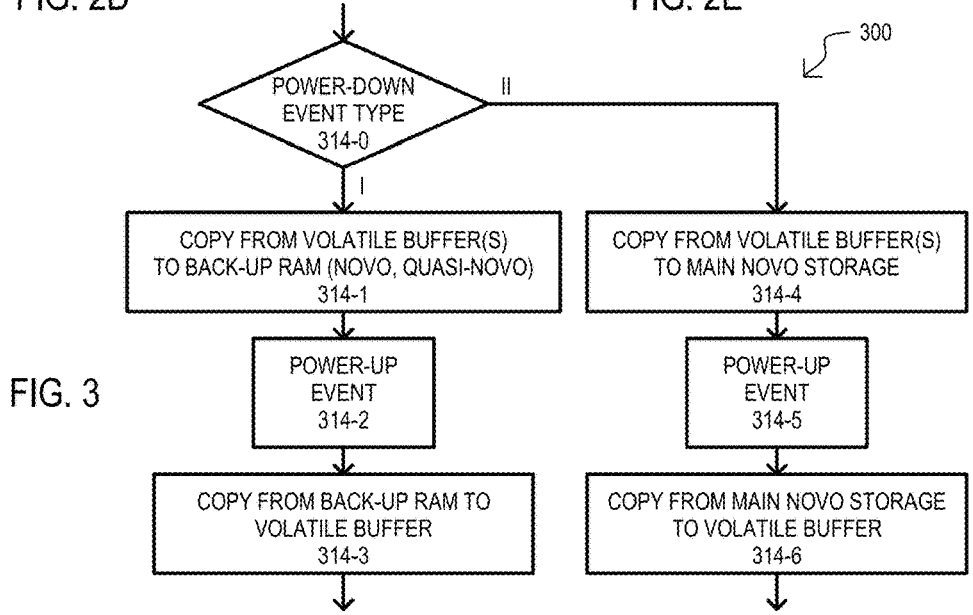
FIG. 3 is a flow diagram showing a method of copying data in a power down event according to an embodiment.

FIG. 3 is a flow diagram of a method 300 for a device like that of FIG. 1 according to an embodiment. In method 300, a device can determine a power-down event type (314-0). In response to a first type power-down event (I from 314-0), data in a volatile section can be copied to a backup section (314-1). Such an event can include an unplanned power interruption or loss of power, as but two examples. Following such a backup operation, in response to a power-up event (314-2), data can be copied from a backup section to a volatile section 314-3, thus returning a device to its prior state.

In response to a second type power-down event (II from 314-0), data in a volatile section can be copied to a main nonvolatile storage (314-4). Such an event can include a controlled power down (i.e., system off) operation, as but one example. Following such a write-to-main action, in response to a power-up event 314-5, data can be copied from a main storage to a volatile section 314-6.

Figure 4:
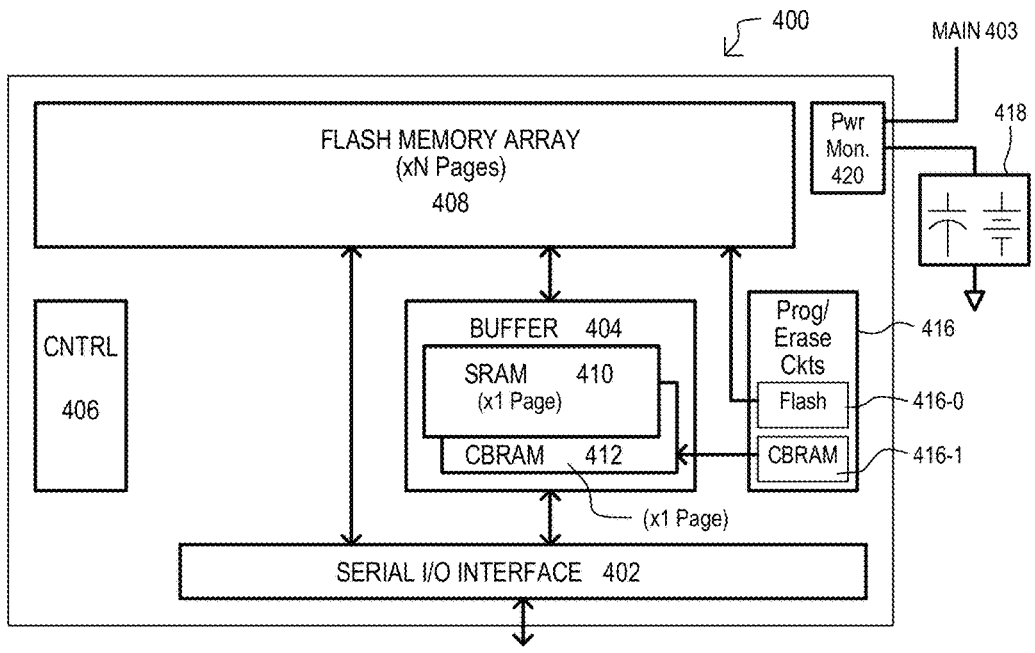
FIG. 4 is a block schematic diagram of a memory device according to another embodiment.

FIG. 4 shows a memory device 400 according to another embodiment. In very particular embodiments, memory device 400 can be one particular implementation of that shown in FIG. 1. In the embodiment shown, an I/F 402 is a serial input/output (I/O) interface. A controller (host) device (not shown) can periodically read and write data to the memory device 400 via I/F 402.

A buffer 404 can include a volatile section 410 formed with SRAM memory cells and a backup section 412 formed with CBRAM type elements. In some embodiments, there can be one CBRAM element per SRAM cell. In other embodiments there can be more than one CBRAM element per SRAM cell. SRAM cells can take any suitable form, including six-transistor and/or four-transistor cells. Further, such SRAM cells can be integrated with backup memory elements, or can be separate from backup memory cells, as described above.

In FIG. 4 a main storage 408 can include one or more arrays of flash memory cells. In particular embodiments, such flash memory can have a NOR configuration. Main storage 408 can be divided into N pages, and can be accessed on page-wise basis. Further, volatile section 410 and backup section 412 can each be one page in size. Thus, data transfers between buffer 404 and main storage 408 can be executed one page at a time. A main storage 408 can have various sizes, and in very particular embodiments, can range from about 512K bits to about 4M bits.

In particular embodiments, write operations to main storage 408 (from buffer 404) can be in the range of milliseconds (e.g., 8-20 ms). In contrast, the time needed to copy data from volatile section 410 to backup section 412 can be considerably shorter (e.g., less than a millisecond). Along these same lines, writing a page of data from a volatile portion 410 to the corresponding backup portion 412 can consume less power than writing a page of data from buffer 404 to main storage 408.

FIG. 4 also shows program erase (P/E) circuits 416. P/E circuits 416 can include flash P/E circuits 416-0 and CBRAM P/E circuits 416-1. Flash P/E circuits 416-0 can provide program and erase conditions (e.g., voltage levels, pulses, compliance currents, etc.) to enable programming and flash erasing of memory cells within main storage 408. Similarly, CBRAM circuits 416-1 can provide program and erase conditions to enable programming and erasing of CBRAM memory cells within backup section 412.

In the particular embodiment of FIG. 4, a device 400 can include power monitoring circuits 420 and backup power source 418. Power monitoring circuits 420 can monitor a main power source MAIN 403 and a backup power source 418. In the event of an interruption in the main power source 403, backup power can be provided to the device by backup power source 418. A backup power source 418 can include a battery and/or a capacitor, including a "super" capacitor.

In particular embodiments, a backup power source 418 can be selected to provide enough power to enable a write from a volatile portion 410 to a backup portion 412 (along with additional guard band power). Further, this power requirement can be less than that needed to write from the buffer 404 to the main storage 408. That is, the power required to write a page of data from SRAM cells to CBRAM elements can be less than that required to program a page of flash memory (i.e., a conventional approach). Accordingly, a memory device 400 can require smaller power supply 418 components (and/or have a smaller power supply 418 requirement) than a conventional device that writes data from an SRAM buffer to a flash main storage. Alternatively, a memory device 400 can have a substantially longer battery life than a conventional device.

Figure 5:
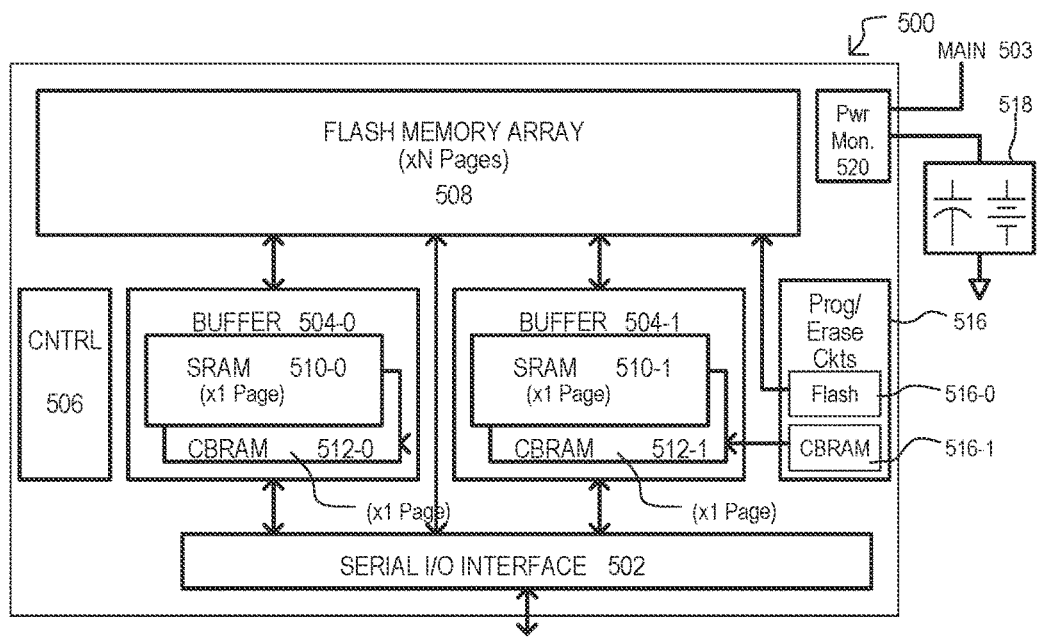
FIG. 5 is a block schematic diagram of a memory device according to a further embodiment.

FIG. 5 shows a memory device 500 according to another embodiment. A memory device 500 can include features like those of FIG. 4, and such like items are referred to by the same reference characters but with the leading digit being a "5" instead of a "4". Memory device 500 differs from that of FIG. 4, but can include two buffers 504-0/1. Accordingly, if one buffer is busy (e.g., programming data to the main storage 508), the other buffer is available for access. It is understood that alternate embodiments can include more than two buffers.

Figure 6B:
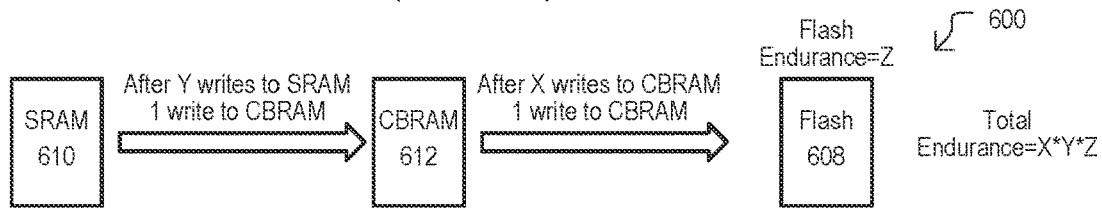

FIGS. 6A and 6B are block diagrams comparing endurance between a conventional memory device and that according to an embodiment. FIG. 6B shows how the inclusion of a buffer with a nonvolatile (or quasi-nonvolatile) backup section can greatly improve overall endurance of a memory device.

FIG. 6A shows the endurance of a conventional device 600' that includes one or more SRAM buffers 601 that periodically save data to a flash memory 608'. Cells of flash memory 608' can have an endurance of Z programs. After Y writes to a buffer 601, there can be one write to the flash memory 608'. Thus, an overall endurance of the device can be characterized as Y*Z.

FIG. 6B shows the endurance of a device 600 according to an embodiment. In FIG. 6B it is assumed that a volatile section 610 (e.g., SRAM) can save data to a backup section 612 (e.g., CBRAM elements) or to a main storage 608 (e.g., flash). (In an alternate arrangement, a backup section could save data to the main storage). In the embodiment shown, after Y writes to a buffer 610, there can be one write to the backup section 612. Then, after X writes to the backup section 612, there can be one write to the main storage 608. Thus, an overall endurance of the device can be characterized as Y*X*Z (i.e., orders of magnitude greater than the conventional case).

Figure 7:
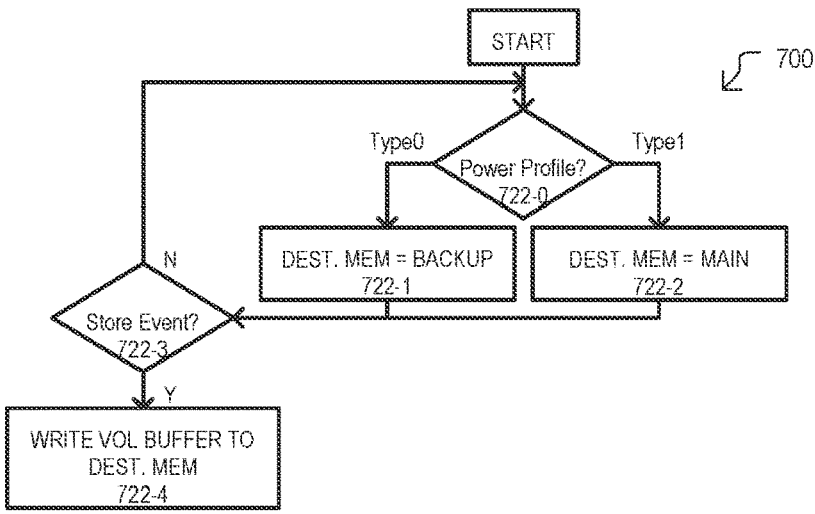
FIG. 7 is a flow diagram of a method of backing up data according to different power profiles according to an embodiment.

FIG. 7 shows a method 700 of operation for a memory device like those shown herein, or equivalents. In method 700, writes can be made to a backup section (e.g., CBRAM elements) or a main storage (e.g., flash) based upon a power profile of the device. A method 700 can determine a power profile of a device (722-0). If a device has a first profile (Type0 from 722-0), a save destination for data in a buffer can be set to the backup section of that buffer 722-1. In contrast, if a device has a second profile (Type1 from 722-0), a save destination for a buffer can be set to the main storage 722-2. In a particular embodiment, a first profile can be a lower power consumption profile than the second profile. If a store event occurs 722-3, the contents of a volatile buffer can be written to the designated memory 722-4 (i.e., backup if a first power profile, or main storage if a second power profile). Accordingly, writes to a backup section of a buffer can vary according to a power profile of a device.

Figure 8:
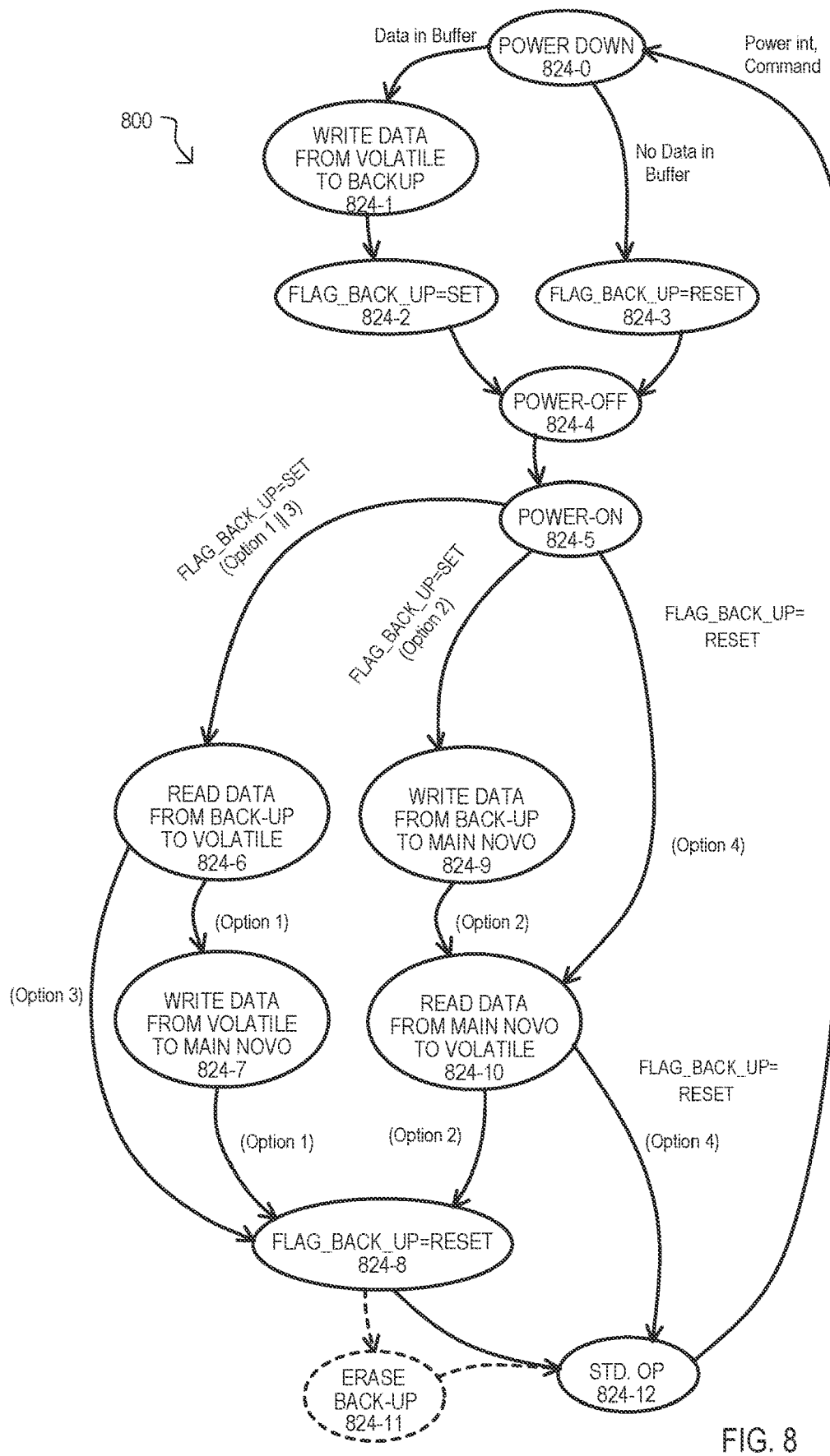
FIG. 8 is a state diagram showing operations executable by a memory device according to an embodiment.

FIG. 8 shows operations 800 executable by a memory device according to an embodiment. Operations 800 can correspond to those performed by a control circuit, or the like, of such a memory device. A device can enter a power down state (824-0) in response to predetermined conditions (e.g., interruption, reset) or a predetermined command. If a buffer includes valid data (Data in Buffer), a device can write data from a volatile section of the buffer to a backup section 824-1. In very particular embodiments, this can include data from an SRAM section being written into CBRAM elements. Once data from the volatile section has been saved, a flag can be set 824-2. If a buffer does not store valid data (No Data in Buffer), a flag can be put into a reset state 824-3. The flag can be stored in a nonvolatile fashion, existing when no power is applied to the memory device. In some embodiments, operations 824-1 to 824-3 can occur while a device is under backup power. A device can then be powered off 824-4.

Upon power-on (or reset or some other like event) 824-5, operations can occur in various ways, depending upon a device configuration. FIG. 8 shows four options: three options (Option 1, 2, 3) corresponding to a first flag case (FLAG_BACK_UP=SET), and one option (Option 4) corresponds to a second flag case (FLAG_BACK_UP=RESET).

Option 1 can correspond to a device having a direct write path between a volatile section of a buffer and a main storage. Accordingly, if a flag indicates a backup section stores data, such data can be read back into the volatile section 824-6 and then written to the main storage 824-7. In very particular embodiments, this can include data from CBRAM elements being read/recalled into an SRAM section, and data from the SRAM section being programmed into a flash memory. A flag can then be reset 824-8.

Option 2 can correspond to a device having a direct write path between a backup section and a main storage. Accordingly, if a flag indicates a backup section stores data, such data can be written from backup section to a main storage 824-9. The same data can then be read from the main storage into a volatile section 824-10. In very particular embodiments, this can include data from CBRAM elements being programmed into a flash memory. A SRAM section can then read such data from the flash memory. Alternatively, after data in a backup section has been written into a main storage, it can be recalled from the backup section into the volatile section. In very particular embodiments, this can include data from CBRAM elements being programmed into a flash memory, and then recalled from the CBRAM elements into the SRAM section. A flag can then be reset 824-8.

Option 3 can correspond to a device that does not write/program data in a backup section to the main storage. Accordingly, after reading data from the backup section to the volatile section 824-6, the flag can be reset 824-8.

Option 4 can correspond to a device that powers off without needing to save any data stored in a buffer (i.e., no need to recall data from backup section). In the example shown, data can be read from a main storage to a volatile section 824-10. In some embodiments, once a flag has been reset 824-8, data in a backup section can be erased 824-11.

From 824-8, 824-10 or 824-11 a device can return to standard operations 824-12. Standard operations can include a device buffering data in a volatile section that can be subsequently written/programmed into a main memory. Standard operations can also include command based operations that can execute any of the actions noted above, or equivalents.

Figure 9:
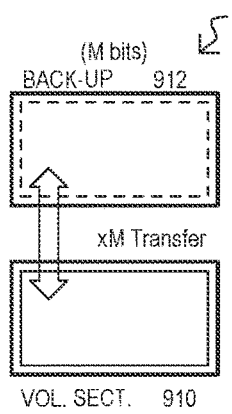
FIG. 9 is a block diagram showing a data transfer operation that can be included in embodiments.

FIG. 9 shows one example of a data transfer for a buffer 904 having a volatile section 910 and a backup section 912 according to an embodiment. In FIG. 9, a buffer 904 has a configuration that enables a single operation to transfer all data from volatile section 910 to backup section 912. In the embodiment shown, a backup section 912 can store M bits. In a single transfer operation, M bits of volatile section 910 can be stored in a backup section 912. In very particular embodiments, an operation like that of FIG. 9 can occur when a buffer 904 has an integrated memory cell configuration (i.e., each memory cell incorporates a volatile portion with one or more nonvolatile (or quasi-nonvolatile) elements). An operation like that of FIG. 9 can allow for fast data transfers, and so rely on a backup power supply that can provide a such backup power in short period of time (e.g., super capacitor dominated).

Figure 10A:
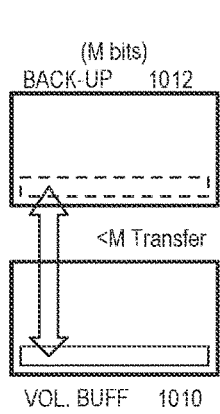
FIGS. 10A to 10C are a sequence of block diagrams showing another data transfer operation that can be included in embodiments.
Figure 10B:
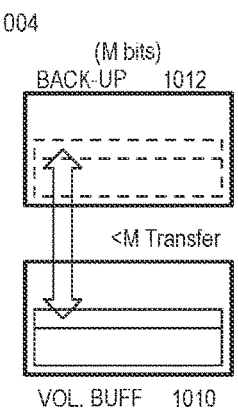
Figure 10C:
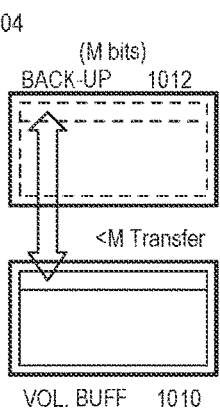

FIGS. 10A to 10C show another example of a data transfer for a buffer 1004 having a volatile section 1010 and a backup section 1012. In FIGS. 10A to 10C, a buffer 1004 has a configuration that enables portions of the overall data to be transferred in a series of write/program operation. As in the case of FIG. 9, a backup section 1012 can store M bits. FIG. 10A shows a first transfer operation, less than M bits are written/programmed to back-up section. FIG. 10B shows a transfer operation part way through, as groups of less than M bits continue to be transferred from the volatile section 1010 to the backup section 1012. FIG. 10C shows a last part of a transfer operation, where the last part of M bit is written/programmed into the backup section 1012. In some embodiments, an operation like that of FIGS. 10A to 10C can occur when a buffer 1004 has separate volatile and backup arrays (i.e., is not a hybrid memory cell case), and an architecture prevents a one-type transfer of all M-bits to a backup section. In other embodiments, a transfer like that of FIGS. 10A to 10C can be performed with a buffer having an integrated memory cell configuration to limit the power surge necessary to write/program the data.

Figure 11:
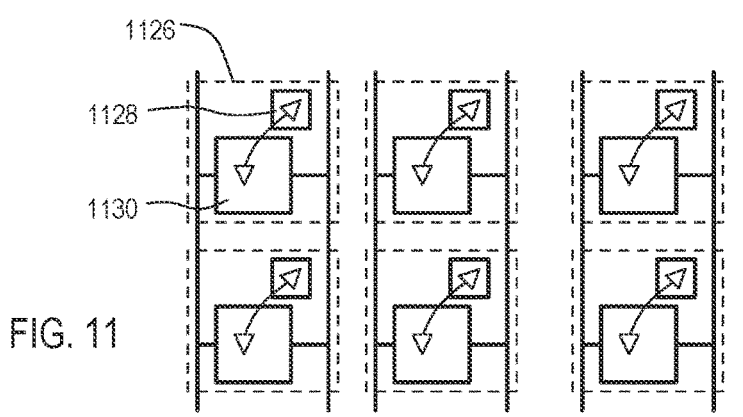
FIG. 11 is a block schematic diagram showing another data transfer operation that can be included in embodiments.

FIG. 11 shows a data transfer in a buffer 1104 according to an embodiment. Buffer 1104 can include memory cells (one shown as 1126) having a volatile portion (e.g., 1130) and a backup portion (e.g., 1128). As shown by the arrows, in a data transfer operation, within each memory cell data can be transferred between the volatile (1130) and back up (1128) portions. In some embodiments, a volatile section 1130 can include a latch. In particular embodiments, a volatile section can include an SRAM-like cell. In some embodiments, a backup section 1128 can include one or more two terminal programmable impedance elements. In particular embodiments, backup sections can include CBRAM type elements.

Figure 12:
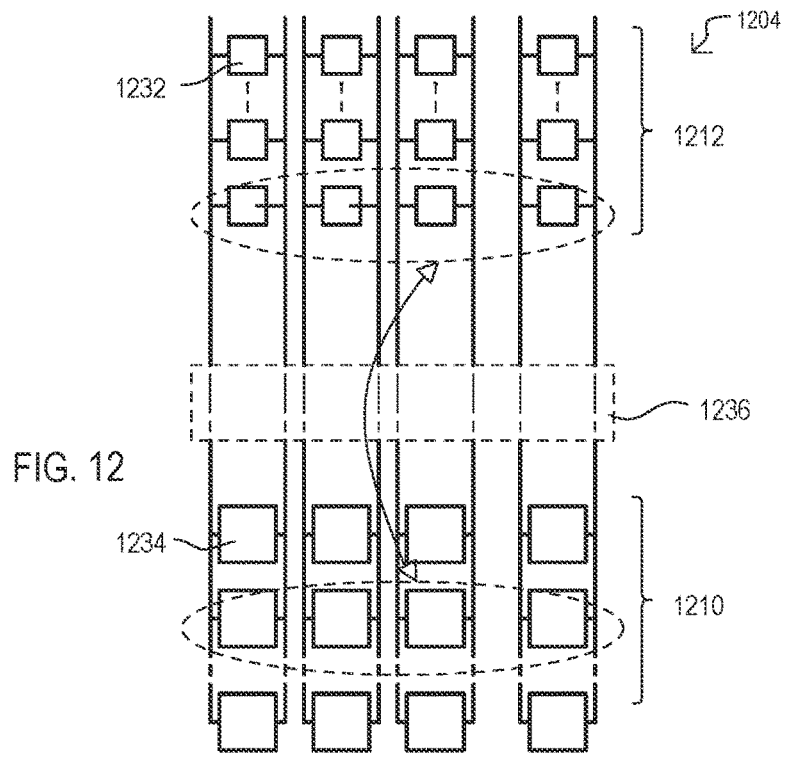
FIG. 12 is a block schematic diagram showing another data transfer operation that can be included in embodiments.

FIG. 12 shows a data transfer in a buffer 1204 according to another embodiment. Buffer 1204 can include a volatile section 1210 formed with a number of volatile memory cells (one shown as 1234), as well as a backup section 1212 formed with a number of backup memory cells (one shown as 1232). As shown by the arrow, in a data transfer operation, data can be transferred from a group of memory cells in one section (i.e., volatile or backup) to a group of memory cells in the other section (i.e., backup or volatile). Optionally, a buffer 1204 can include registers 1236 (or similar circuits) for storing data from one section before it is written/programmed into the other section. In some embodiments, a volatile section 1210 can include suitable volatile memory cells including but not limited to SRAM, DRAM or other memory cell types. A backup section 1212 can include programmable impedance cells that include two terminal memory elements, including but not limited to CBRAM type memory cells.

Figure 13:
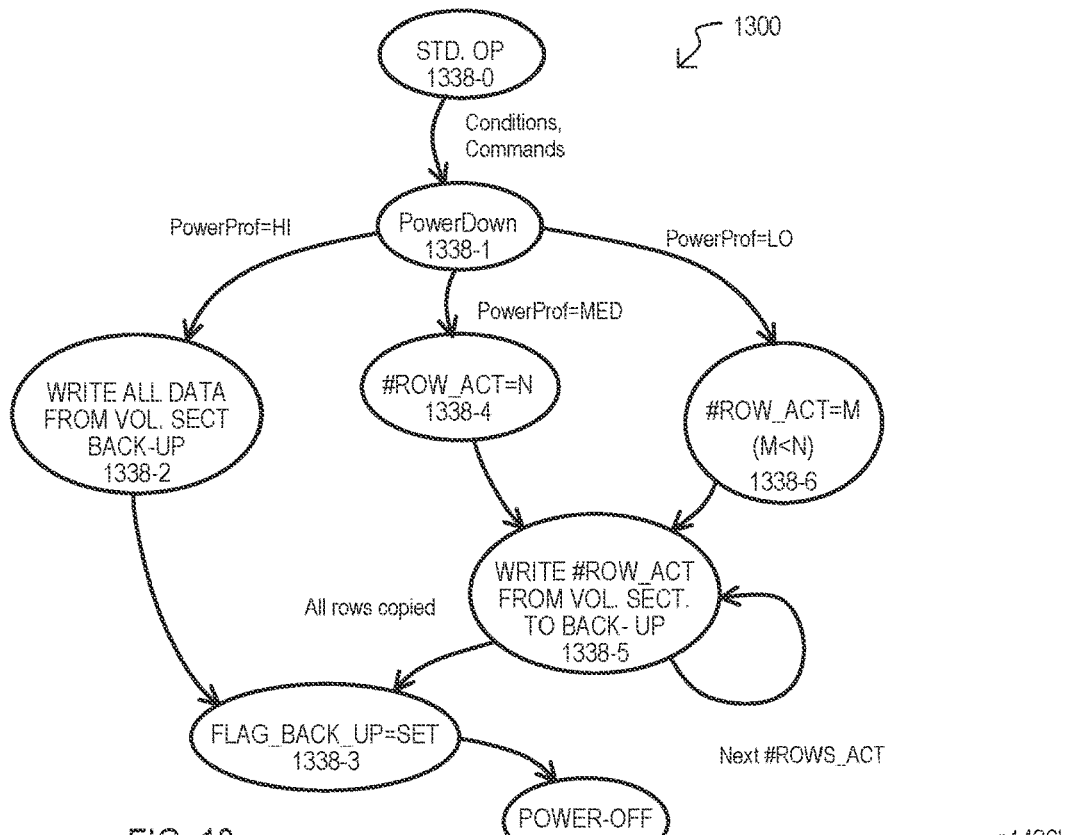
FIG. 13 is a state diagram showing power down operations executable by a memory device according to embodiments.

FIG. 13 shows other operations 1300 executable by a memory device according to an embodiment. Operations 1300 can correspond to those performed by a control circuit, or the like, of a memory device. FIG. 13 shows operations in which the number of rows in a buffer transfer (i.e., transfer between a volatile section and backup section) can vary according to a power profile.

From standard operations 1338-0 (e.g., buffering data to a main storage), a device can enter a power down state 1338-1 in response to certain conditions or a predetermined command. If a device has a first profile (PowerProf=HI), all data in a volatile section can be written into a backup section 1338-2. A flag can then be set, indicating data has been copied to a backup section 1338-3.

If a device has a second profile (PowerProf=MED), which can correspond to a lower peak power, a row number can be set to a first value (N) 1338-4. A device can then copy N rows of a volatile section to a backup section 1338-5. Successive groups of N rows can be copied until all rows have been copied.

If a device has a third profile (PowerProf=LO), which can correspond to an even lower peak power, a row number can be set to a second value (M<N) 1338-6. A device can then copy M rows of a volatile section to a backup section 1338-5. Successive groups of M rows can be copied until all rows have been copied.

Once all data has been copied from a volatile section to a backup section, a flag can be set 1338-3. A device can then power off 1338-7.

Figures 14A, 14B:
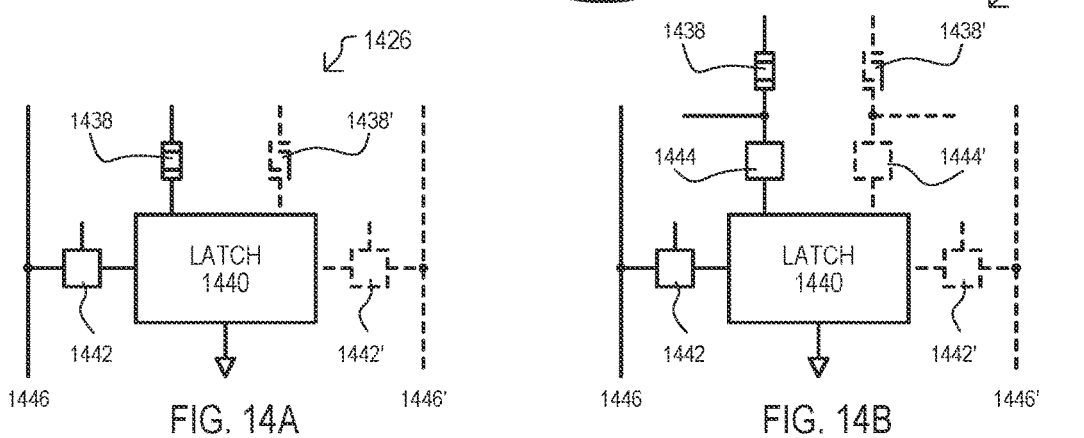
FIGS. 14A to 14C are block schematic diagrams of buffer memory cells that can be included in embodiments.
Figures 14C, 15:
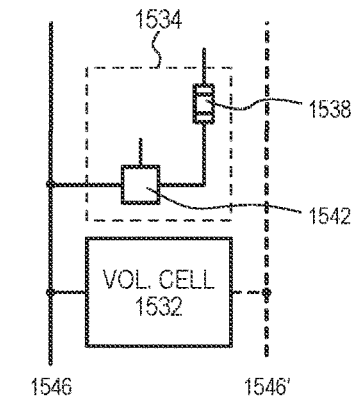
FIG. 15 is a block schematic diagram of another buffer memory cell that can be included in embodiments.

FIGS. 14A to 14C show particular integrated memory cells that can be included in buffers of the embodiments. It is understood that the memory cells of shown are but exemplary, and should not be construed as limiting. FIG. 14A shows a memory cell 1426 having a latch 1440, a memory element 1438, and an access device 1442. A latch 1440 can include one or more internal data nodes that can latch to one of two levels. An access device 1442 can connect a data node, directly or indirectly, to a bit line 1446. A memory element 1438 can be a two-terminal element that can be programmed between two or more different impedance levels. In particular embodiments, such elements can retain data in a nonvolatile (or quasi-nonvolatile) fashion. A memory element 1438 can be connected, directly or indirectly, to a data node within latch 1440. Optionally, the memory cell 1426 can have a complementary memory element 1438' that connects, directly or indirectly, to a data node opposite to that of memory element 1438. In addition or alternatively, a complementary access device 1442' can be included that connects another bit line 1446', directly or indirectly, to a data node opposite to that of access device 1442. To store data in a backup section, memory cells 1438/1438' can be programmed to opposite impedance states.

FIG. 14B shows another memory cell 1426' that includes items like those of FIG. 14A. In addition, memory cell 1426' includes an isolation device 1444 that can isolate a memory element 1438 from latch 1440 during standard buffer operations (e.g., read and writes to a volatile portion). Isolation device 1444 can connect memory element 1438 to latch 1440 when a data value is to be programmed into the memory element 1438, or when a data value is being recalled from memory element 1438 into the latch 1440. Optionally, the memory cell 1426' can have a complementary isolation device 1444' connected between a complementary element 1438' and the latch 1440, and operate like isolation device 1444.

FIG. 14C shows another memory cell 1426" that includes items like those of FIG. 14B. In addition, memory cell 1426" includes a second isolation device 1446. A second isolation device 1446 can connect a data node within latch 1440 to a predetermined voltage during standard buffer operations, and isolate the latch 1444 from such a voltage data value is to be programmed into, or recalled from the memory element 1438. Optionally, the memory cell 1426" can have a complementary second isolation device 1446' connected between a data node of latch and the predetermined voltage, and can operate like second isolation device 1446.

FIG. 15 shows an alternate buffer structure that can be included in embodiments. A buffer can include volatile memory cells (1532) with matching backup memory cells (1534). A volatile memory cell 1532 can be an SRAM type cell that shares a bit line 1546 with the backup memory cell 1534. A backup memory cell 1534 can include an access device 1542 and a memory element 1538. A memory element 1538 can be like 1438 of FIG. 14A, or an equivalent. Isolation device 1542 can isolate a memory element 1538 from bit line 1546 during standard buffer operations (e.g., read and writes to a volatile portion), and can connect memory element 1538 to bit line 1546 when a data value is to be programmed into, or recalled from, the memory element 1538.

FIG. 16 shows the physical structure of a buffer 1604 according to an embodiment. A buffer 1604 can include a layer of active devices 1652 formed in a substrate 1656. In some embodiments, a volatile portion of the buffer 1604 can be realized by such active devices. Active devices can include transistors, such as insulated gate (e.g., MOS) field effect transistors (FETs), including those with planar gates and "fin" FET structures, bipolar junction transistors, junction FETs, or other suitable three (or more) terminal switching devices.

A memory element layer 1654 can be formed over the active device layer 1652 and include memory elements (one shown as 1638) formed therein. Memory elements can be two-terminal elements as described herein or equivalents. It is understood that a memory element layer 1654 can take various forms different from that shown in FIG. 16 according to the particular memory element type. In this way, according to one embodiment, a buffer can be formed having backup memory elements formed physically over the circuitry that forms the volatile portion.

While devices can include circuits with buffer memories between an interface and a main memory, other embodiments can include microprocessors with cache memories having structures like such buffer memories. In such embodiments, cache memory data for a processor can be backed up from volatile memory to backup memory, where the backup memory is formed with nonvolatile or quasi-nonvolatile memory.

Examples of such processor and system embodiments will now be described.

FIG. 17 shows an IC device 1700 according to another embodiment. An IC device 1700 can include a processor section 1701 that includes processor circuits 1702, a level one (L1) cache 1704-0, level two (L2) cache 1704-1, a mode register 1712, and flag register 1714. Processor circuits 1702 can include processing circuits for executing instructions. Processing circuits 1702 can rely on L1 and L2 caches 1704-0/1 to store data and/or instructions for fast access, according to any suitable caching technique.

Either or both caches 1704-0/1 can include a volatile section 1706 and a backup section 1708. A volatile section (e.g., 1706) can take the form of any of those shown in embodiments herein (e.g., 110-0/1, 410, 504-0/1, 910, 1010, volatile portions of cells shown in FIG. 11, or 1210). In one very particular embodiment, a volatile section can include SRAM cells. A backup section 1708 can take the form of any of the shown in embodiments herein (e.g., 112-0/1, 412, 512-0/1, 912, 1012, nonvolatile/quasi-nonvolatile portions of cells shown in FIG. 11, 1212). In one very particular embodiment, a backup section 1708 can include elements based on a solid electrolyte layer, or other redox reaction, or the like. Accordingly, data can be transferred between a volatile section 1706 and its backup section 1708 according to techniques shown herein, or equivalents. For example, data can be transferred on one operation, or a series of operations.

In some embodiments, processor circuits 1702 can copy data from volatile sections 1706 of caches 1704-0/1 to backup sections 1708, and in addition, can copy data from volatile sections 1706 or backup sections 1708 to bus attached storage 1710 (e.g., a hard disk drive (HDD) or solid state drive (SSD)).

A mode register 1712 can store mode information. In some embodiments, according to mode information, processor circuits 1702 can vary where data in volatile sections 1706 are stored (i.e., backed up). For example, if mode data stored in mode register 1712 has one value, data in volatile sections 1706 can be backed up to backup sections 1708. However, if such data has a second value, data in volatile sections 1706 can be backed up to bus attached storage 1710.

A flag register 1714 can store an indication as to where cache data has been backed up. For example, a flag within flag register 1714 can be set to one value when data from a volatile section 1706 is copied to backup section 1708, and can be set to another value when data from a volatile section 1706 to bus attached storage 1710.

FIG. 18 shows a processing section 1800 according to a particular embodiment. A processing section 1800 can include processor circuits 1802-0, a memory access circuit 1802-1, an L2 cache 1804-2, a first L1 cache 1804-0, and a second L1 cache 1804-1. A memory access circuit 1802-1 can enable data (including instructions) to be transferred between processor circuits 1802-0 and caches 1804-0/1/2.

An L2 cache 1804-2 can be a "unified" cache that stores both data and instructions for access by processor circuits 1802-0. In the particular embodiment of FIG. 18, first L1 cache 1804-0 can be an instruction cache that stores instructions executable by processor circuits 1802-0, and second L1 cache 1804-1 stores data accessible by processor circuits 1802-0. Any or all of caches 1804-0/1/2 can include a volatile section 1806-0/1/2 and backup section 1808-0/1/2 that can take the form of any of the caches/buffers described herein, or equivalents.

It is understood that the cache structure of FIG. 18 is but one implementation. Alternate embodiments can include fewer or greater cache levels (i.e., layer three cache), and different cache architectures (e.g., just in time execution, for example).

FIG. 19 shows a conventional system 1901 to better understand embodiments of the invention. A conventional system 1901 includes a processor section 1903, bus interface (I/F) chip set 1913, system RAM 1915, and bus attached storage 1910. Processor section 1903 can include a cache memory 1907 for caching instructions and/or data.

Chip set 1913 can include a Northbridge portion 1913-0 and a Southbridge portion 1913-1. A Northbridge portion 1913-0 can control data transfers between a processor section 1913-0 and a system RAM 1915. A Southbridge portion 1913-1 can control transfers between a processor section 1903 and bus attached storage 1910. In operation, a system 1901 can periodically backup data in a cache memory 1907 to bus attached storage 1910. Thus, upon power-up or reset, a system 1901 can copy cache data from bus attached storage 1910 to cache memory to rapidly resume a previous state.

FIGS. 20A to 20C shows a system 2000 and corresponding operations according to various embodiments. FIGS. 20A to 20C are block diagrams of a system 2000 and corresponding methods. A system 2000 can include a processor section 2002, a bus I/F chip set 2020, system RAM 2024, and bus attached storage 2010. A processor section 2002 can include processor circuits, a cache memory 2004, power profile register 2012, and flag register 2014. A cache memory 2004 can include a volatile section 2006 and backup section 2008, which can take the form of any of the cache memories described herein, or equivalents. A power profile register 2012 can store a power profile value for system 2000. A flag register 2014 can store a number of flags, including one or more cache backup flags that indicate where cache data has been backed up (e.g., stored in a nonvolatile or quasi-nonvolatile fashion).

Bus I/F chip set 2020 can include a Northbridge portion 2022-0 and a Southbridge portion 2022-1. A Northbridge portion 2022-0 can control data transfers between processor section 2002 and other system regions, such as system RAM 2024 (which may be attached to a memory bus). A Southbridge portion 2022-1 can control data transfers between processor section 2002 and other system regions, including bus attached storage 2010. A bus attached storage 2010 can be a nonvolatile storage device, including but not limited to a HDD or SSD.

FIG. 20A shows a cache backup operation according to an embodiment. In FIG. 20A data stored in volatile section 2006 can be backed up to backup section 2008 via a data transfer 2026. Such an operation can be in response to predetermined events, including but not limited to: a power down operation; a periodic backup operation; and/or the start of a reset operation. In some embodiments, such operations can result in a value being set in flag register 2014 that indicates cache data is stored in backup section 2008.

FIG. 20A also shows a cache restore operation according to an embodiment. In the cache restore operation, data within backup section 2008 can be copied to volatile section 2006 via a data transfer 2026. Such an operation can be in response to predetermined events, including but not limited to: a power-on operation and/or the latter part of a reset operation. In some embodiments, operations like those of FIG. 20A can be mode dependent. For example, if values stored by power profile register 2012 indicate a low power mode of operation, system 2000 can backup cache data as shown in FIG. 20A. Cache backup and restore operation like that shown in FIG. 20A can consume less power than conventional approaches like that of FIG. 19. In addition, such operations can be faster than those like that of FIG. 19.

FIG. 20B shows how a system 2000 can also backup and recall values via data transfers (2028) to bus attached storage 2010, as in FIG. 19. In some embodiments, operations like those of FIG. 20B can be mode dependent. For example, if values stored by power profile register 2012 indicate a standard power mode of operation, system 2000 can back up a cache as shown in FIG. 20B. Further, according to embodiments, such operations can result in a value being set in flag register 2014 that indicates cache data is stored in bus attached storage 2010 and not backup section 2008.

FIG. 20C shows a further cache backup operation that can be included in embodiments. In FIG. 20C it is assumed that data in volatile section 2006 has already been backed up into backup section 2008, as in FIG. 20A. In FIG. 20C, data in backup section 2008 can be written to bus attached storage 2010 via a data transfer 2030. Further, as in the case of FIG. 20B, such operations can result in a value being set in flag register 2014 that indicates cache data is stored in bus attached storage 2010 and not backup section 2008.

FIG. 20D are diagrams showing instructions executable by a processor section according to embodiments. FIG. 20D shows a Cache Save operation 2016 that can backup cache data according to a power profile. In the event a cache save operation is to be performed (if save_cache), an operation 2016 can check to see if a certain power profile is indicated (if power_mode=low_power). If the power profile is indicated, data in a cache (e.g., a volatile section) can be written to a backup section (write cache to backup). Further, a value can bet set that indicates cache data is stored in the backup section (set flag_cache_backup=1). If, however, the power profile is not indicated (else), data in a cache can be written to another storage device, such as bus attached storage (write cache to hard drive). Further, a value can bet set that indicates cache data is stored in such storage (set flag_cache_backup=0).

FIG. 20D also shows a Cache Recall operation 2019 that restores cache data from different locations according to an indication. In the event a cache restore operation is to be performed (if recall_cache), an operation 2019 can check a value that indicates whether the cache data is stored in a backup section or not (if set_flag_cache_backup=1). If the value indicates cache data is in a backup section, data in the backup section can be read into the cache (read from backup to cache). If, however, cache data is not in the backup section, data in another storage location (such as bus attached storage) can be read into the cache (read from hard drive to cache).

Figure 21A:
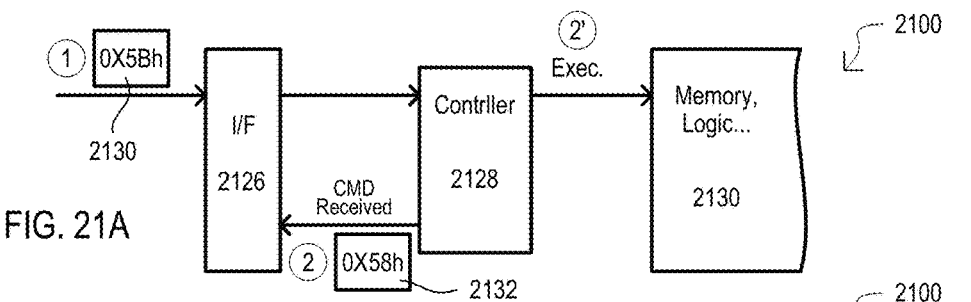
FIGS. 21A and 21B are block schematic diagrams of a system according to another embodiment.
Figure 21B:
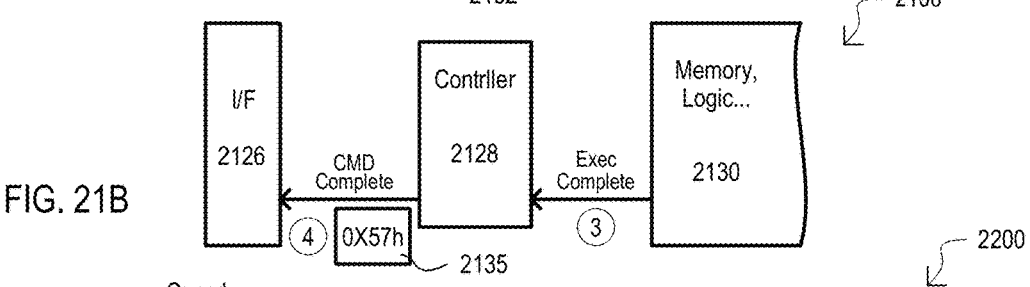

FIGS. 21A and 21B shows a system 2100 according to another embodiment. A system 2100 can include an interface 2126, a controller 2128, and application circuits 2130. An interface 2126 can receive commands, with or without corresponding data, for execution by controller 2128 working with application circuits 2130. In some embodiments, received commands can be multi-bit values unique to each command. In very particular embodiments, commands can be indicated by a 16-bit field. An interface 2126 can be any suitable interface for receiving signals, but in some embodiments can be a serial interface.

A controller 2128 can generate control signals and sequences in response to received commands for controlling operations within application circuits 2130. Application circuits 2130 can include logic and/or memory circuits that are accessed by controller 2128. In some embodiments, application circuits 2130 can include buffers and/or caches having the structure of embodiments shown herein, or equivalents.

Referring to FIG. 21A, at (1) a command 2130 can be received at interface 2126 and forwarded to controller 2128. At (2) controller 2128 can generate a command received acknowledgement 2132. According to embodiments, both a command 2130 and command received acknowledgement 2132 can be multi-bit values. In a particular embodiment, a unique command received acknowledgement can be generated for each command, or group of like commands. A command received acknowledgement 2132 can be forwarded to interface 2126 for output by the interface, or access via the interface. It is understood that a command received acknowledgement 2132 can output from, or presented at, interface 2126 before the corresponding command is fully executed by application circuits 2130 and/or before application circuits 2130 indicate the command cannot be executed. At (2') controller 2128 can generate signals for application circuits 2130 to perform operations indicated by the command 2130.

Referring to FIG. 21B, at (3) application circuits 2130 can complete operations and generate an execution complete indication. This indication can be received by controller 2128. At (4) controller 2128 can generate a command complete code 2135 which can be forwarded to interface 2126. Interface 2126 can output the command complete code 2135, or store such a value for subsequent reading. In some embodiments, a system 2100 can generate another acknowledgement if a command cannot be executed. It is understood that a command complete code 2135 (or command not executed code) can be different from the command received acknowledgement code 2132. Further, command complete code 2135 (or command not executed code) can be output/presented well after the command received acknowledgement code 2132.

Figure 22:
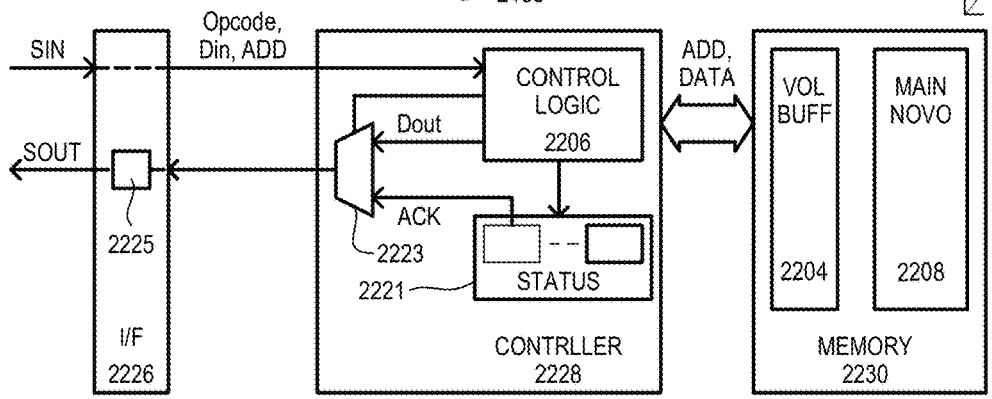
FIG. 22 is a block schematic diagram of a system according to another embodiment.

FIG. 22 is a block schematic diagram of a system 2200 according to another particular embodiment. A system 2200 can include an interface 2226, controller 2228 and application circuit 2230. An interface 2226 can be a serial data interface that can receive serial data on an input serial line SIN and output data on an output serial line SOUT. In the particular embodiment shown, interface 2226 can include a driver 2225 for driving SOUT. In particular embodiments, a driver 2225 can be capable of driving SOUT into a high impedance state. In very particular embodiments, a driver 2225 can be an "open collector" type driver or a tri-state driver, as but two examples. As shown, data received on SIN can include a command (e.g., opcode) as well as address values (ADD) and/or data (Din), such as write data (data to be written into application circuit 2230).

Controller can include control logic 2206, a status register 2221 and mode MUX 2223. Control logic 2206 can generate control signals in response to received commands. Such control signals can enable operations to be performed within application circuit 2230. A status register 2221 can store status values that can be accessed via interface 2226. For example, a host device, via a command on SIN can request status data be output on SOUT. As shown, mode MUX 2223 can output either data (Dout) or a value from status register on SOUT. In particular embodiments, a value from status register can serve as a command received acknowledgement and/or command complete acknowledgement. Such a value can be driven on SOUT to provide such acknowledgement(s) to a host device.

In the embodiment shown, application circuit 2230 can be a memory circuit having a buffer 2204 and nonvolatile main storage 2208 as described for embodiments herein, or equivalents.

Figure 23A:
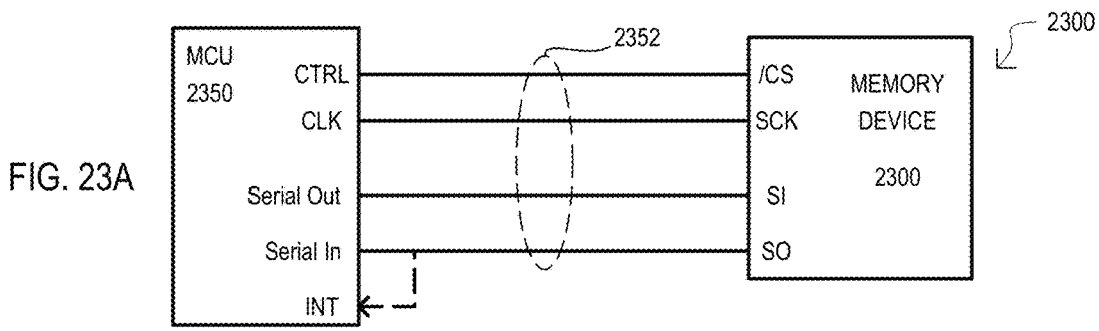
FIGS. 23A and 23B are diagrams showing a system and operation according to embodiments.

FIG. 23A shows a system 2300 according to another embodiment. A system can include a memory device 2300 and a host device 2350. A memory device 2300 can include a serial data input (SI), serial data output (SO), serial clock input (SCK), and chip select input (/CS). Memory device 2300 can be connected to a host device 2350 by a serial data bus 2352. In the particular embodiment shown, a host device 2350 can be a microcontroller (MCU). Serial data bus 2352 can have serial data lines that connect SO, SI, SCK and /CS of memory device 2300 to a serial input (Serial In), serial output (Serial Out), clock output (CLK), and control output (CTRL), respectively, of host device 2350. Optionally, serial output (SO) can also be connected to an interrupt (INT) input of host device 2350. In this way, SO can serve as an interrupt for a host device 2350.

Figure 23B:
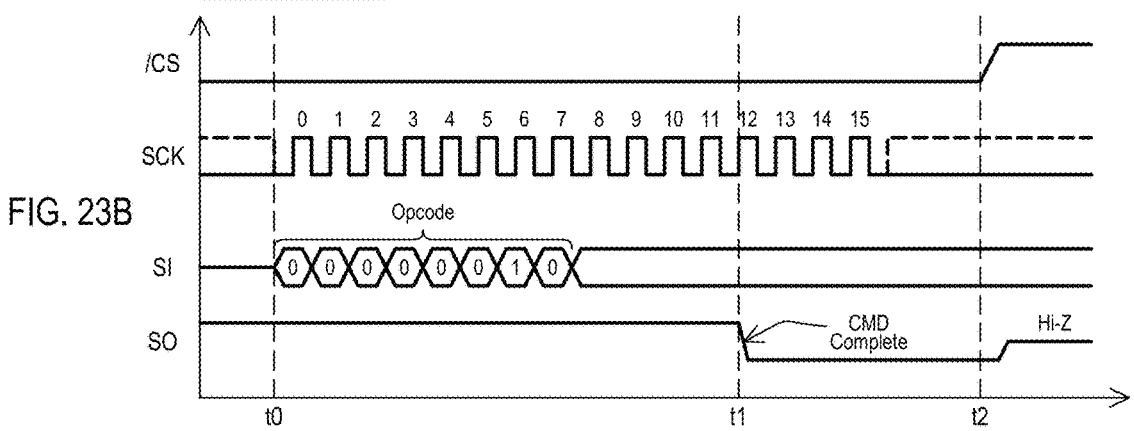

FIG. 23B is a timing diagram showing the generation of command acknowledgements for the system of FIG. 23A. At time t0, with a chip select input (/CS) active (low), a command (Opcode) can be received from a host device. It is understood that address and/or data can follow such a command based on the operation to be performed. In the very particular embodiment shown, a command can be a serial stream of bits input in synchronism with a clock signal received at clock input (SCK). Output SO can be high. Following the receipt of the command (Opcode), a memory device 2300 can begin executing operations in response to the commands.

At time t1, once operations have been completed in response to the command (Opcode), memory device 2300 can drive SO low, providing a command complete acknowledgement for the host device 2350. It is understood that this acknowledgement can be detected at a serial input (Serial In) of the host device 2350 or as an interrupt at interrupt input INT. At time t2, /CS can return to the inactive level (high). As a result, SO can be driven to a high impedance state.

Figure 24A:
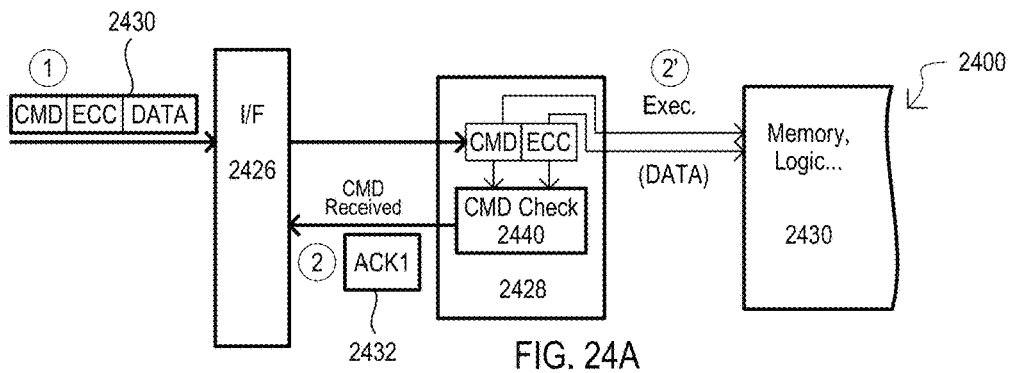
FIGS. 24A and 24B are block schematic diagrams of a system and corresponding operations according to another embodiment.
Figure 24B:
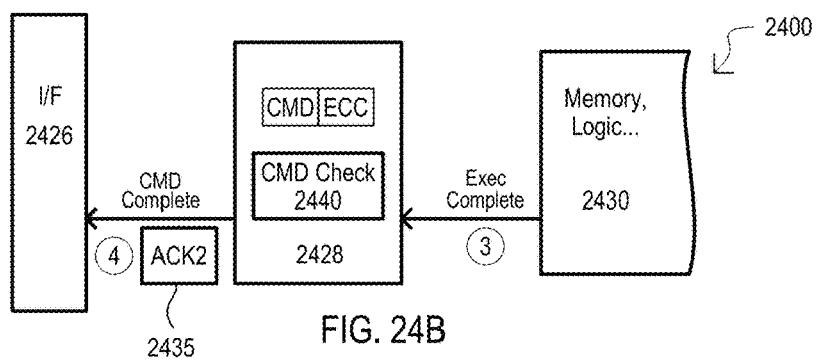

FIGS. 24A and 24B shows a system 2400 according to a further embodiment. A system 2400 can include items like those of FIGS. 21A and 21B. Such like items are referred to by the same reference character but with the leading digits being "24" instead of "21".

FIGS. 24A and 24B can differ from FIGS. 21A and 21B in that a received command 2430 can include a command code (CMD), an error correction and/or detection code (ECC), and optionally, data (DATA) and address values. An ECC code can be generated from the command code CMD. A controller 2428 can include command check circuits 2440 which can verify a received command code (CMD) based on the corresponding ECC. In some embodiments, an ECC encoding can be varied for different customers or applications. Accordingly, a common command set for controller can be distinguished between customers based on the ECC encoding employed.

Referring to FIG. 24A, at (1) a command 2430 can be received at interface 2426 and can include command code (CMD), ECC code and optionally data (DATA). These values can be forwarded to controller 2428. Command check circuits 2440 within controller 2428 can check the CMD value to the corresponding ECC value. If the CMD is correct, at (2) controller 2428 can generate a command received acknowledgement 2432. As in the embodiments above, both a command 2430 and command received acknowledgement 2432 can be multi-bit values, with an acknowledgement uniquely identifying a command 2430 or group of similar commands. A command received acknowledgement 2432 can be forwarded to interface 2426 for output by at interface (or to be read from the interface 2426) before the corresponding command is fully executed by application circuits 2430 and/or before application circuits 2430 indicate the command cannot be executed. At (2') operations can occur as described for FIGS. 21A and 21B. A controller 2428 can generate signals for application circuits 2430, which can include forwarding received data (DATA) and address values to the application circuits 2430.

Referring to FIG. 24B, operations can occur as in (3) and (4) of FIG. 21B. After a command has been executed (or it has been determined the command cannot be executed), an acknowledgement 2435 can be output to interface 2426. Acknowledgement 2435 is different from the command received acknowledgement 2432.

As noted above, in some embodiments a buffer/cache structure can include volatile circuits formed in a substrate as well as nonvolatile or quasi-nonvolatile (i.e., backup elements) elements formed over the substrate. In some embodiments, such backup elements can be part of the same integrated circuit die as the volatile elements (e.g., as in FIG. 16). However in other embodiments, volatile elements and corresponding backup elements can be formed on a separate dice. Once such embodiment is shown in FIG. 25.

Figure 25:
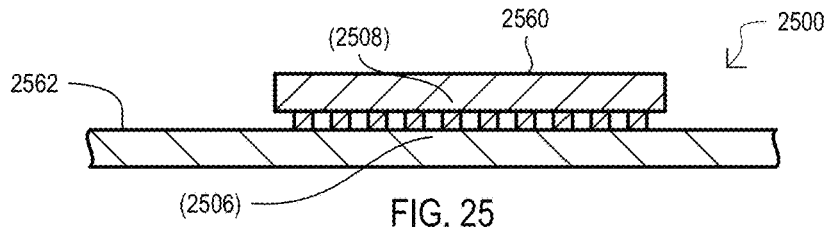
FIG. 25 is a side cross sectional view of an IC device according to an embodiment.
Figure 26:
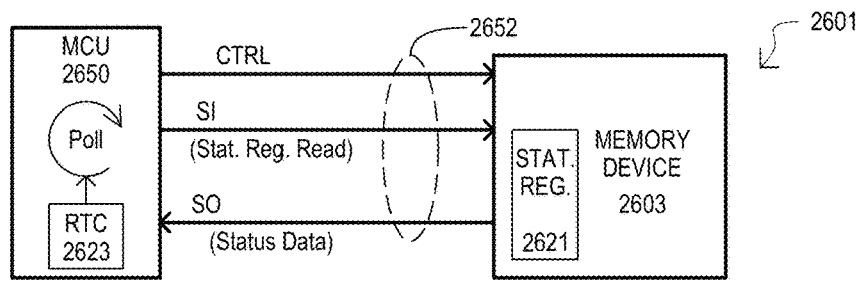
FIGS. 26 and 27 are block schematic diagrams of conventional systems.
Figure 27:
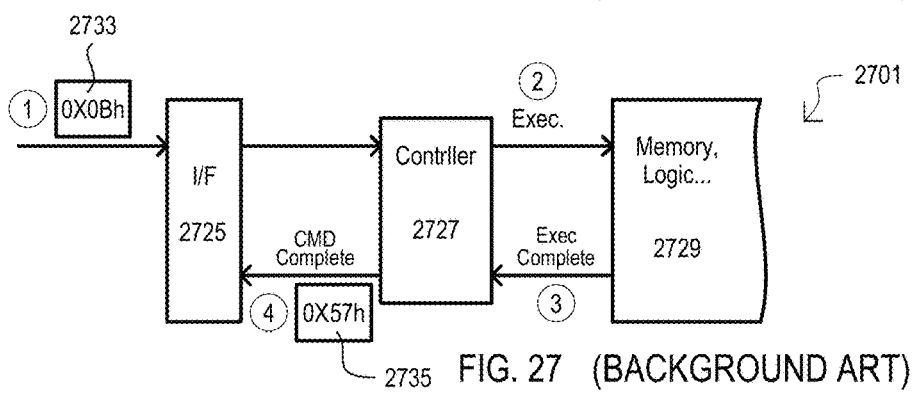

FIG. 25 shows a device 2500 that includes a first die 2560 and a second die 2562. In the particular embodiment shown, a backup section 2508 (e.g., backup section of a buffer or cache) can be formed as part of first die 2560. A volatile section 2506 can be formed as part of a second die 2562. First and/or second die (2560/2562) can include various other circuit sections.

It should be appreciated that reference throughout this description to "one embodiment" or "an embodiment" means that a particular feature, structure or characteristic described in connection with the embodiment is included in at least one embodiment of an invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

It is also understood that other embodiments of this invention may be practiced in the absence of an element/step not specifically disclosed herein.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   at an interface of a memory device,
      receiving an operational code (op code) on a serial bus as a sequence of no less than 16-bit values in synchronism with a serial clock signal; and
      receiving an error code with each op code at the interface;
   by operation of controller circuits of the memory device,
      generating a plurality of acknowledgement values in response to each received op code, the acknowledgement values each being a multi-bit value, and
      determining if the error code corresponds to the op code with which the error code was received to verify the op code; and
   by operation of memory circuits of the memory device,
      executing or not executing a memory access operation to memory cell arrays of the memory device as indicated by the op code; wherein in response to the memory access operation being executed by the memory circuits and the error code verifying the op code, the controller circuit generating a first acknowledgement value and a second acknowledgement value for output at the interface, and in response to the memory access operation not being executed by the memory circuits and the error code verifying the op code, the controller circuit generating the first acknowledgement value and a third acknowledgement value for output at the interface.

2. The method of claim 1, wherein:

in response to the memory access operation being executed by the memory circuits, the first acknowledgement value is presented at the interface before the second acknowledgement value; and in response to the memory access operation not being executed by the memory circuits, the first acknowledgement value is presented at the interface before the third acknowledgement value.

3. The method of claim 1, wherein each of the acknowledgement values has the same bit size as the op code.

4. The method of claim 1, further including storing the acknowledgement values in status registers of the interface.

5. The method of claim 1, further including:

in response to the memory access operation being executed by the memory circuits, outputting the first acknowledgement value followed by the second acknowledgement value on the serial bus; and in response to the memory access operation not being executed by the memory circuits, outputting the first acknowledgement value followed by the third acknowledgement value on the serial bus.

6. The method of claim 5, wherein the first, second and third acknowledgement values are different sequences of no less than 16-bit values output in synchronism with the serial clock signal.

7. A memory device, comprising:

a serial interface (IF) that includes a serial clock input and at least one serial data input, the serial IF configured to receive an operational code (op code) of no less than 16-bits on the serial data input in synchronism with a serial clock signal received at the serial clock input, receive an error code with the op code, and provide a plurality of acknowledgement values in response to the received op code;

controller circuits that include error check circuits and are configured to generate the plurality of acknowledgement values, including first and second acknowledgement values in response to an operation indicated by the op code being completed and the error check circuits verifying the op code with the error code received with the op code, and first and third acknowledgement values in response to an operation indicated by the op code not being completed and the error check circuits verifying the op code with the error code received with the op code; and memory circuits that include at least one array of nonvolatile memory cells and at least one array of volatile memory cells, the memory circuits configured to execute the operation indicated by the op code to access the nonvolatile memory cells, and indicate to the controller circuits if the operation was completed or if the operation was not completed; wherein the first, second and third acknowledgement values are different multi-bit values.

8. The memory device of claim 7, wherein the serial IF further includes a serial output and is configured to output the plurality of acknowledgements on the serial output.

9. The memory device of claim 7, wherein the serial IF further includes a plurality of status registers configured to store the plurality of acknowledgements.

10. The memory device of claim 7, wherein:

the serial IF is further configured to provide the first acknowledgment value before the second acknowledgment value, and provide the first acknowledgment value before the third acknowledgment value.

11. The memory device of claim 7, wherein each of the acknowledgement values has the same bit size as the op code.

12. The memory device of claim 7, wherein the serial IF, controller circuits and memory circuits are all formed in the same integrated circuit substrate.

13. A system, comprising:

a memory device having a serial interface (IF) coupled to a serial bus and configured to receive an operational code (op code) of no less than 16-bits from the serial bus in synchronism with a serial clock signal, receive an error code with the op code, and provide a plurality of acknowledgement values in response to the received op code;

controller circuits that include error check circuits and are configured to generate the plurality of acknowledgement values, including first and second acknowledgement values in response to an operation indicated by the op code being completed and the error check circuits verify the op code with the error code received with the op code, and first and third acknowledgement values in response to an operation indicated by the op code not being completed and the error check circuits verify the op code with the error code received with the op code, and memory circuits that include at least one array of memory cells and configured to execute the operation indicated by the op code to access the memory cells and indicate to the controller circuits if the operation was completed or if the operation was not completed; and a host device coupled to the serial bus and configured to transmit the op code to the memory device.

14. The system of claim 13, wherein:

the serial interface includes status registers configured to store the acknowledgement values; and the host device is further configured to read the acknowledgement values from the memory device status registers over the serial bus.

15. The system of claim 14, wherein the host device is configured to read the first acknowledgement value prior to the second and third acknowledgement values.

16. The system of claim 13, wherein each of the acknowledgement values has the same bit size as the op code.

17. The system of claim 13, wherein:
the serial IF is further configured to
- provide the first acknowledgment value before the second acknowledgment value, and
- provide the first acknowledgment value before the third acknowledgment value.

\* \* \* \* \*